(12) United States Patent
Le Taillandier De Gabory et al.

(10) Patent No.: US 8,971,702 B2
(45) Date of Patent: Mar. 3, 2015

(54) METHOD AND APPARATUS FOR DETECTING CHROMATIC DISPERSION, AND METHOD AND APPARATUS FOR COMPENSATING CHROMATIC DISPERSION

(75) Inventors: Emmanuel Le Taillandier De Gabory, Minato-ku (JP); Manabu Arikawa, Minato-ku (JP); Kiyoshi Fukuchi, Minato-ku (JP)

(73) Assignee: NEC Corporation, Tokyo (JP)

( * ) Notice: Subject to any disclaimer, the term of this patent is extended or adjusted under 35 U.S.C. 154(b) by 343 days.

(21) Appl. No.: 13/520,487

(22) PCT Filed: Jan. 5, 2011

(86) PCT No.: PCT/JP2011/050040
§ 371 (c)(1),
(2), (4) Date: Jul. 3, 2012

(87) PCT Pub. No.: WO2011/083798
PCT Pub. Date: Jul. 14, 2011

(65) Prior Publication Data
US 2012/0281981 A1    Nov. 8, 2012

(30) Foreign Application Priority Data
Jan. 5, 2010    (JP) .................................. 2010-000497

(51) Int. Cl.
*H04B 10/079*    (2013.01)
*H04B 10/077*    (2013.01)
(Continued)

(52) U.S. Cl.
CPC ......... *H04B 10/0775* (2013.01); *G01M 11/338* (2013.01); *H04B 10/25133* (2013.01); *H04B 2210/074* (2013.01)
USPC .......................................................... 398/29

(58) Field of Classification Search
CPC .................................................. H04B 10/07951
USPC .......................................................... 398/29
See application file for complete search history.

(56) References Cited

U.S. PATENT DOCUMENTS

2002/0126351 A1* 9/2002 Chung et al. ................... 359/124
2005/0146710 A1* 7/2005 Zaacks et al. ................... 356/73

(Continued)

FOREIGN PATENT DOCUMENTS

JP    2000-346748 A    12/2000
JP    2003-134047 A    5/2003

(Continued)

OTHER PUBLICATIONS

Kuwahara, Shoichiro, et al., "Adaptive dispersion equalization with the detection of dispersion fluctuation using PM-AM conversion", Abstract for the Annual Meeting 1998 of Communications Society: Institute of Electronics, Information, and Communication Engineers (IEICE), 1998, p. 417.

(Continued)

*Primary Examiner* — Nathan Curs
(74) *Attorney, Agent, or Firm* — Sughrue Mion, PLLC

(57) ABSTRACT

A method of monitoring chromatic dispersion when transmitting an optical signal includes: applying, to an optical signal in which the symbol rate is f, a dip in optical intensity for every n symbols by means of pseudo-RZ modulation where n is an integer equal to or greater than 2, and transmitting the optical signal to which dips have been applied to a transmission path; receiving the optical signal that is transmitted in by the transmission path and detecting the intensity of a frequency component of k*f/n from the received signal where k is an integer equal to or greater than 1; and based on the detected intensity, generating a monitor signal that represents the chromatic dispersion amount.

16 Claims, 13 Drawing Sheets

(51) Int. Cl.
*G01M 11/00* (2006.01)
*H04B 10/2513* (2013.01)

(56) References Cited

U.S. PATENT DOCUMENTS

| | | | | |
|---|---|---|---|---|
| 2009/0129789 | A1* | 5/2009 | Hanawa | 398/214 |
| 2010/0283996 | A1* | 11/2010 | Wan et al. | 356/73.1 |
| 2012/0230673 | A1* | 9/2012 | Striegler et al. | 398/16 |

FOREIGN PATENT DOCUMENTS

| | | |
|---|---|---|
| JP | 2006-80770 A | 3/2006 |
| JP | 2006-345541 A | 12/2006 |
| JP | 2008-10971 A | 1/2008 |
| JP | 2009-284104 A | 12/2009 |
| WO | 2007/004338 A1 | 1/2007 |

OTHER PUBLICATIONS

Le Taillandier De Gabory, Emmanuel, et al., "Pseudo-Return-to-Zero Modulation Scheme: Application to the Compensation of Intra-Polarization Skew for PolMux Signals", ECOC 2009, Sep. 2009, pp. 1-2, Paper 3.4.4.

Sohma, S., et al., "40 λ WDM Channel-by-Channel and Flexible Dispersion Compensation at 40Gb/s Using Multi-channel Tunable Optical Dispersion Compensator", ECOC 2009, Sep. 2009, pp. 1-2, Paper 3.3.1.

International Search Report of PCT/JP2011/050040, dated Mar. 22, 2011.

Communication dated Sep. 30, 2014 from the Japanese Patent Office in counterpart application No. 2011-549006.

* cited by examiner

METHOD AND APPARATUS FOR DETECTING CHROMATIC DISPERSION, AND METHOD AND APPARATUS FOR COMPENSATING CHROMATIC DISPERSION

CROSS REFERENCE TO RELATED APPLICATIONS

This application is a National Stage of International Application No. PCT/JP2011/050040 filed Jan. 5, 2011, claiming priority based on Japanese Patent Application No. 2010-000497 filed Jan. 5, 2010, the contents of all of which are incorporated herein by reference in their entirety.

TECHNICAL FIELD

The present invention relates to the measurement and compensation of chromatic dispersion in optical communications, and more particularly to the so-called in-service measurement of chromatic dispersion which simultaneously carries out data transmission and chromatic dispersion measurement in a fiber optic communication system, and to the use of the result of this measurement of chromatic dispersion in the compensation of chromatic dispersion.

BACKGROUND ART

Data transmission rates in a fiber optic communication system that uses optical fibers to transmit signals are seeing even greater improvements. In a fiber optic communication system, an optical fiber that is a transmission path or transmission line has chromatic dispersion as one of its characteristics, and the waveform distortion produced in optical signals by this chromatic dispersion is a factor that limits transmission rate and transmission distance. Accordingly, there is a need for technology for accurately measuring chromatic dispersion in the optical fiber that is the transmission path and then adjusting in accordance with the measurement result to make the chromatic dispersion substantially zero. Adjustment techniques for making the chromatic dispersion substantially zero are known as, for example, equalization or dispersion compensation. In the following explanation, chromatic dispersion is simply referred to as "CD."

In a fiber optic communication system, because the two ends of a transmission path are typically in separated locations and the chromatic dispersion of the optical fiber varies according to the temperature and external pressure, the measurement and adjustment of CD must be carried out on the far end, i.e., the receiving end of an optical signal, during operation of the system.

As a first example of the related art for meeting these demands, a PM-AM conversion method is used as a measurement method on the far end and a monitor light of a different wavelength than the signal transmission is used to detect CD of the transmission path during system operation. The PM-AM conversion method uses the principle that upon transmission of a phase-modulated monitor light, the monitor light that has undergone phase-modulation (PM) is converted to amplitude modulation (AM) under the influence of CD. The first example of the related art is shown in, for example, Kuwahara Shoichiro, et al., "Adaptive dispersion equalization with the detection of dispersion fluctuation using the PM-AM conversion," Abstract for the Annual Meeting 1998 of Communications Society: Institute of Electronics, Information and Communication Engineers (IEICE), pp. 417 (1998) [NPL1]. The first example of the related art is here described based on the paper by Kuwahara, et al.

FIG. 1 shows the system shown by Kuwahara et al. In the transmission end of this system, a signal light from optical transmitter (TX) 1400 to which a data signal having a high bit rate is applied and a monitor light are multiplexed by optical coupler (CPL) 1412, and the combined light is transmitted to transmission path 1404 such as an optical fiber. Laser light source 1401 of a wavelength that differs from that of the signal light, sine wave generator (SINE GEN) 1402, and phase modulator (PHASE MOD) 1403 are provided to generate the monitor light. In phase modulator 1403, the monitor light is generated by subjecting the light from laser light source 1401 to phase modulation by the sine wave signal from sine wave generator 1402.

The signal light and the monitor light that is of a different wavelength than the signal light are propagated on transmission path 1404. These two light beams propagated on transmission path 1404 come into wavelength demultiplexer (CPL) 1405 at a reception end. Wavelength demultiplexer 1405 separates the received light into the signal light and monitor light. Of these, the signal light is received into optical receiver (RX) 1406, whereby the data signal is reproduced from the signal light. On the other hand, the monitor light is propagated through chromatic dispersion compensator (CD COMP) 1407 and then comes into photodetector (PD) 1408. Photodetector 1408 carries out square-law detection of the monitor light, whereby the output of photodetector 1408 is proportional to the amplitude modulation component in the monitor light. Average measurement circuit (AVG) 1411 and band-pass filter (BPF) 1410 are provided at the output of photodetector 1408, whereby the average level of the detection signal of photodetector 1408 and the intensity of the frequency component of the sine wave signal used in the phase modulation on the transmission side are found. Control circuit 1409 finds the value of CD on transmission path 1404 from the ratio of the average level of the detection signal and the intensity of the frequency component of the sine wave signal and generates a control signal that becomes feedback to the transmission side.

In this system, adjustment by a known method is carried out before operation of the system such that residual CD at the wavelength of the signal light becomes zero. At this time, CD at the monitor light wavelength that differs from the wavelength of the signal light typically does not become zero due to the wavelength dependence of CD. Consequently, in order to also set CD at the monitor light wavelength to zero, the amount of compensation is adjusted in CD compensator 1407 with respect to monitor light that has been separated from the signal light.

When adjustment is thus carried out before operation to set CD relating to the signal light and monitor light to zero and CD of transmission path 1404 diverges from zero during operation, the monitor signal that is undergoing phase modulation is converted to intensity modulation by CD, whereby a frequency component of the sine-wave signal used in phase modulation appears in the square-law detection output of photodetector 1408 on the receiving side. Control circuit 1409 thereupon judges whether CD relating to the monitor light has diverged from zero based on the ratio of the average level of the detection signal and the intensity of the frequency component of the sine-wave signal. Upon detecting that CD has diverged from zero, control circuit 1409 transmits a control signal to the transmitting side to initiate control for changing the wavelength of the monitor light such that the CD detected at photodetector 1408 relating to monitor light is made zero.

When the wavelength of the monitor light is changed and the sine-wave signal frequency component in the detection signal at photodetector 1408 becomes zero, the transmission path CD in the monitor light also becomes zero, whereby the wavelength control of the monitor light is halted. The wavelength of the signal light is then shifted by the amount that the wavelength of the monitor light at this time has been already shifted. In this way, CD relating to the signal light can again be set to zero. Thus, by means of the first example of related art, detecting shift of CD of a monitor light from zero enables control such that the CD of the signal light wavelength becomes zero.

As a second example of the related art relating to the present invention, JP-A-2000-346748 [PL1] discloses the monitoring of a CD value by, when transmitting a data signal by means of wavelength multiplexing that uses two different wavelengths, superposing a signal for CD measurement on the optical signal that follows multiplexing and then detecting this signal for measurement on the reception end. In this second example of the related art, an intensity modulation signal is used as an in-service signal used in data transmission and this intensity-modulated signal is wavelength-multiplexed. Then, using a sine-wave signal that has been phase modulated by a pseudo-random code as a CD detection signal, the superposition of the signal is carried out by applying minute intensity-modulation that is driven by the CD detection signal to the optical signal that follows wavelength multiplexing. When there is chromatic dispersion, a difference occurs between the two wavelengths used in signal transmission in the times of arrival at the receiving side of the CD detection signal, whereby the CD detection signals are demodulated at each of the two wavelengths on the receiving side and the time difference in the demodulated codes is detected to enable detection of the CD. Because this technique employs pseudo-random codes, it has the advantage that detection accuracy does not decrease even in cases in which the superposition level of the CD detection signal cannot be made large.

As the third example of the related art of the present invention, JP-A-2003-134047 [PL2] discloses the measurement of wavelength dependency of transmission delay of a transmission path and finding chromatic dispersion in an optical transmission system that carries out wavelength multiplexing, by detecting frames belonging to the data signal of each wavelength channel either constantly or at short repeating times and then carrying out a relative comparison of the frame phases for each wavelength channel.

SUMMARY

Problem to be Solved by the Invention

Nevertheless, in the first example of the related art among the above-described examples of the related art, a specific wavelength region is used for the monitor light used in the measurement of CD, and further, the optical intensity of the monitor light must be relatively large to raise the measurement accuracy. As a result, the problem arises that the wavelength region for the monitor light cannot be used for transmission of the signal light, whereby the transmission bandwidth decreases when considered as the entire transmission path.

In the second example of the related art, the unconditional superposition of a signal for detecting CD upon data transmission by intensity modulation complicates the avoidance of deterioration of the main signal component by the superposition of the signal for detecting CD. The main signal component is the signal component used in data transmission. In addition, although a high frequency must be used as the signal for detecting CD to increase the accuracy of measuring CD, a low-frequency signal must be used when broadening the range of CD detection, whereby measurement having both high accuracy and broad range becomes problematic when using the second example of the related art.

The third example of the prior art presupposes the implementation of wavelength multiplexing, whereby the problem arises that this third example cannot be applied in an optical transmission system in which wavelength multiplexing is not carried out. In addition, even in a wavelength multiplexing system, the measurement of CD is not possible in a system in which frame phases of data signals are not rigorously aligned for each wavelength channel on the transmitting side.

It is an exemplary object of the present invention to provide a method and device that can detect chromatic dispersion of a broad range that can occur in an optical transmission path, and to thus provide a method and device for controlling chromatic dispersion.

It is another object of the present invention to provide a method and device that can detect and control chromatic dispersion while carrying out actual data transmission.

Means for Solving the Problem

According to one exemplary embodiment of the present invention, a method of monitoring chromatic dispersion when transmitting an optical signal includes: applying, to an optical signal in which the symbol rate is f, a dip in optical intensity for every n symbols by means of pseudo-RZ modulation where n is an integer equal to or greater than 2, and transmitting the optical signal to which dips have been applied to a transmission path; receiving the optical signal that is transmitted in by the transmission path and detecting the intensity of a frequency component of $k*f/n$ from the received signal where k is an integer equal to or greater than 1; and based on the detected intensity, generating a monitor signal that represents the chromatic dispersion amount.

According to another exemplary embodiment of the present invention, a method of equalizing chromatic dispersion when transmitting an optical signal includes: applying, to an optical signal in which the symbol rate is f, a dip in optical intensity for every n symbols by means of pseudo-RZ modulation where n is an integer equal to or greater than 2, and transmitting the optical signal to which dips have been applied to a transmission path; receiving the optical signal that is transmitted on the transmission path and detecting the intensity of a frequency component of $k*f/n$ from the received signal where k is an integer equal to or greater than 1; based on the detected intensity, generating a monitor signal that represents the chromatic dispersion amount; and controlling an equalizer that equalizes the optical signal such that the value indicated by the monitor signal is minimized.

According to yet another exemplary embodiment of the present invention, a device that monitors chromatic dispersion when transmitting an optical signal includes: a transmitter that applies, to an optical signal in which the symbol rate is f, a dip in optical intensity for every n symbols by means of pseudo-RZ modulation where n is an integer equal to or greater than 2 and transmits the optical signal to which dips have been applied to a transmission path; and a chromatic dispersion monitor that receives the optical signal that is transmitted on the transmission path, that detects the intensity of a frequency component of $k*f/n$ from the received signal where k is an integer equal to or greater than 1, and that, based on the detected intensity, generates a monitor signal that represents the chromatic dispersion amount.

According to yet another exemplary embodiment of the present invention, a device that equalizes chromatic dispersion when transmitting an optical signal includes: a transmitter that applies, to an optical signal in which the symbol rate is f, a dip in optical intensity for every n symbols by means of pseudo-RZ modulation where n is an integer equal to or greater than 2 and transmits the optical signal to which dips have been applied to a transmission path; a chromatic dispersion monitor that receives the optical signal that is transmitted on the transmission path, that detects the intensity of a frequency component of k*f/n from the received signal where k is an integer equal to or greater than 1, and that, based on the detected intensity, generates a monitor signal that indicates the chromatic dispersion amount; and a chromatic dispersion equalizer that equalizes the optical signal that is received from the transmission path such that the value represented by the monitor signal is minimized.

In order to enable detection of chromatic dispersion on the receiving side in the present invention, for example, dips in optical intensity are applied every n symbols where n is an integer equal to or greater than 2 by means of pseudo-RZ modulation or a pseudo-RZ format to an optical signal in which the symbol rate is f, and then the optical signal to which dips have been applied is transmitted to a transmission path. Compared to a case in which normal RZ modulation is carried out, in pseudo-RZ modulation, the length of time in a dip in which the intensity of an optical signal is extremely small is extremely short, whereby the quality of the optical signal is maintained from the standpoint of data transmission despite the addition of these dips to the optical signal. Accordingly, chromatic dispersion can be detected on the receiving side while actually carrying out data transmission, and moreover, using the wavelength that is used in this data transmission. Equalization of the optical signal such that the residual chromatic dispersion becomes zero can be carried out based on these detection results. By means of this type of method, the bandwidth for data transmission is not decreased for the detection of chromatic dispersion.

DESCRIPTION OF EXEMPLARY EMBODIMENTS

Figure 1:
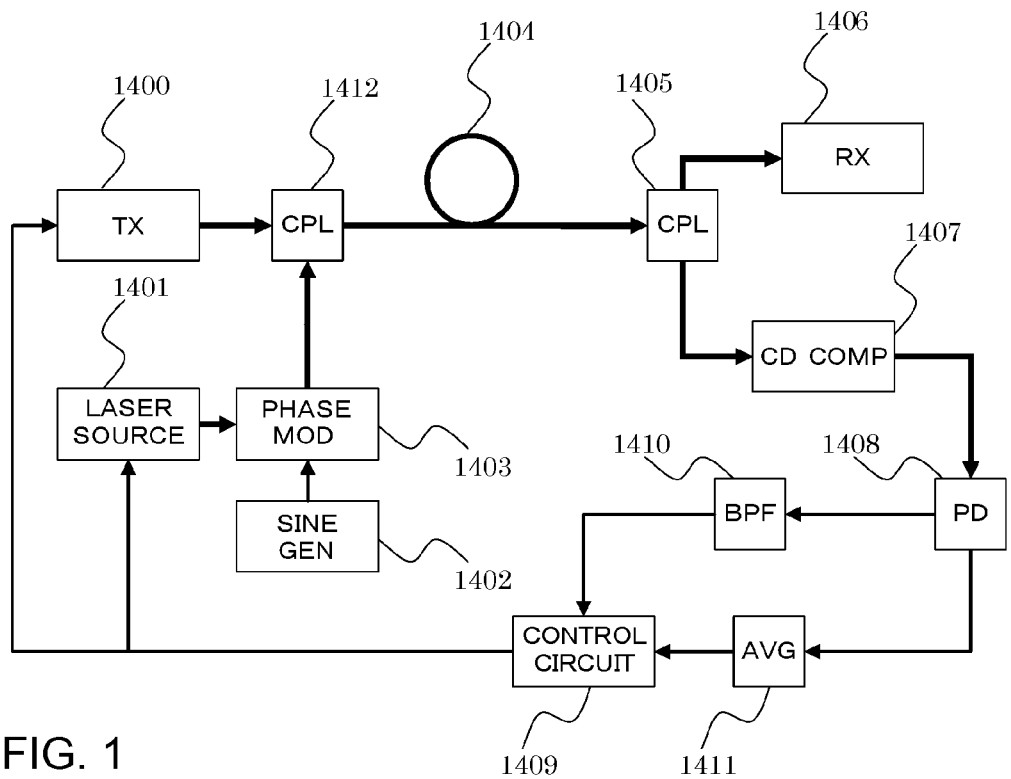
FIG. 1 is a block diagram showing an example of the configuration of the optical transmission system in which chromatic dispersion is measured by a PM-AM conversion method.
Figure 2:
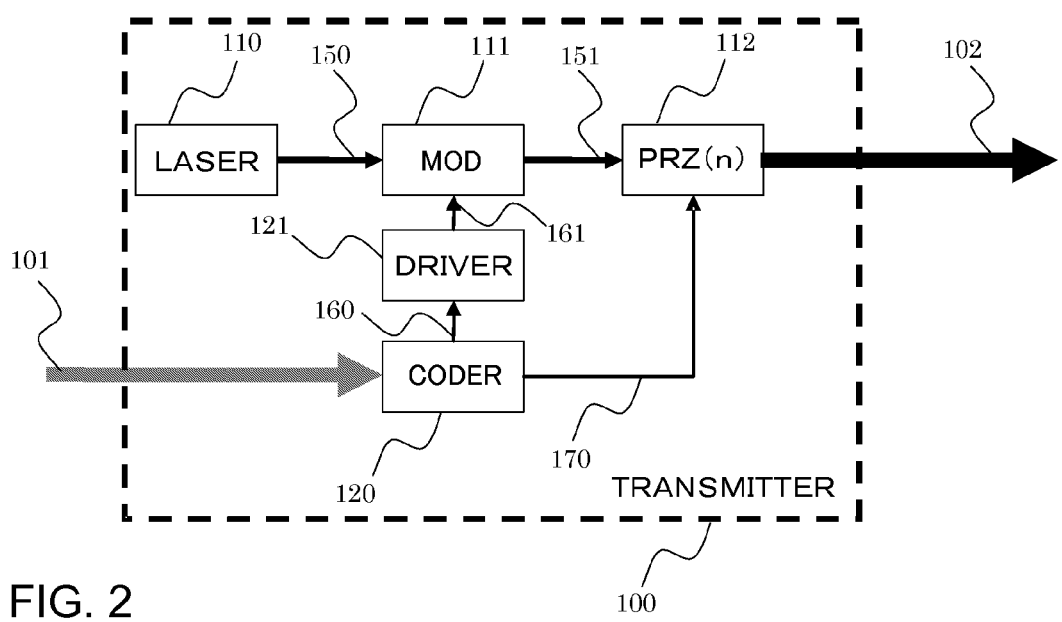
FIG. 2 is a block diagram showing the configuration of a transmitter in the first exemplary embodiment of the present invention.
Figure 3:
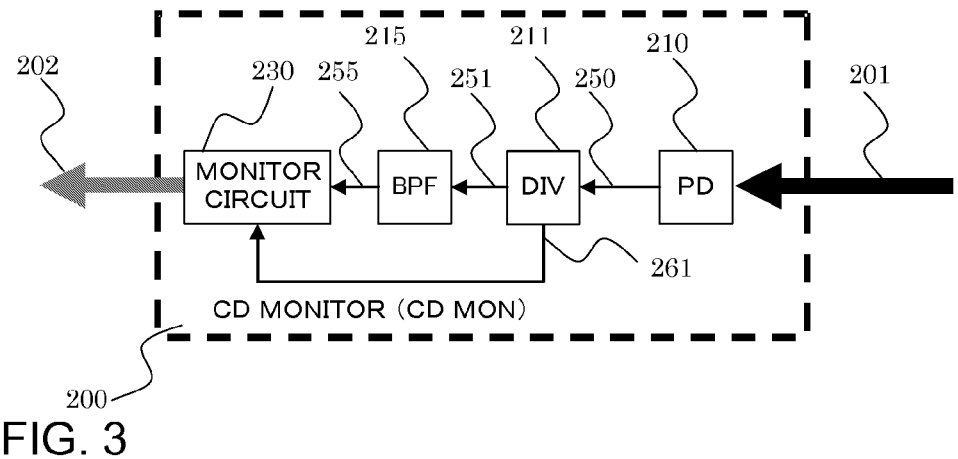
FIG. 3 is a block diagram showing the configuration of a CD monitor in the first exemplary embodiment of the present invention.

FIG. 2 and FIG. 3 are drawings for describing an optical transmission system according to the first exemplary embodiment of the present invention, FIG. 2 showing the configuration of transmitter 100 used in this optical transmission system, and FIG. 3 showing the configuration of CD monitor (CD MON) 200 that can be used in tandem with transmitter 100.

The optical transmission system shown in FIGS. 2 and 3 carries out optical data transmission to a receiving end from transmitter 100 by way of a transmission path composed of optical fiber or the like and is capable of detecting, at the receiving end, chromatic dispersion on the transmission path when carrying out optical data transmission. A receiver that carries out demodulation and the like of the optical signal to generate a data signal and CD monitor 200 that monitors the level of chromatic dispersion in the received optical signal are provided on the receiving end.

As shown in FIG. 2, transmitter 100 transmits a single-polarization pseudo-RZ (return-to-zero) signal to a transmission path and includes: laser 110 that is the light source of optical carrier 150; modulator (MOD) 111 that modulates optical carrier 150; pseudo-RZ carver (PRZ(n)) 112 that carries out optical pulse carving to apply a dip for each n symbols to the optical signal; coder 120 that encodes an electric signal, i.e., data signal 101, that indicates data to be transmitted to generate digital data 160 for modulation; and driver 121 that drives modulator 111 based on digital data 160. Here, n is any integer equal to or greater than 2, such as 4, 8, or 16. Driver 121 converts digital data signal 160 to a suitable voltage signal 161 and supplies to the modulation input of modulator 111 to drive modulator 111. Modulator 111 thus modulates optical carrier 150 based on voltage signal 161.

In this configuration of transmitter 100, clock signal 170 of the same frequency f as the symbol rate (i.e., baud rate) of the signal from coder 120 is conferred to pseudo-RZ carver 112, and by using this clock signal 170, pseudo-RZ carver 112 applies a dip for every n symbols to optical signal 151 that follows modulation. These dips make the intensity of optical signal 151 extremely low, for example, make the intensity of the optical signal zero, for extremely short time intervals. The pseudo-RZ carver can be configured by, for example, a frequency divider that frequency-divides clock signal f into n divisions, a D-type flip-flop that takes the output of the frequency divider as D inputs and clock signal f as clock input, and a phase modulator (PSK) that phase modulates the optical signal according to the output of the D-type flip-flop, as described in E. Le Taillandier de Gabory, et al., "Pseudo-Return-to-Zero Modulation Scheme: Application to Compensation of Intra-Polarization Skew for PolMux Signals," ECOC 2009, paper 3.4.4 (2009) [NPL2].

The addition of a dip for every n symbols by the pulse-carving technique makes the optical output extremely low at the positions of these dips, and these dips can be seen as return-to-zero in the optical signal. In a typical RZ signal, the intensity or polarity of the signal over the length of one-half the time of continuation of one symbol is taken as the intensity or polarity that corresponds to the data value "0," but in the present exemplary embodiment, dips are applied of a length of time that is sufficiently short compared to the time of continuation of one symbol. As a result, the application of dips of this narrow width to the optical signal using the pulse carving technique is here called pseudo-RZ modulation. In WO2007/004338 [PL3], a technique is shown in which the use of pseudo-RZ modulation enables the easy extraction of a clock signal from an optical signal. Similarly, JP-A-2006-345541 [PL4] shows a technique in which converting an optical signal of NRZ (non-return-to-zero) modulation to an optical signal of pseudo-RZ modulation enables the easy extraction of a clock signal.

Optical signal 102 that has been modulated by modulator 111 by data signal 101 that is an electric signal and to which dips have been applied by pseudo-RZ modulation for every n symbols by pseudo-RZ carver 112 is supplied from transmitter 100, and this optical signal is sent to the receiving end by way of a transmission path.

In the configuration shown in FIG. 2, transmitter 100 is, for example, a 55-Gb/s (Gb/s) PRZ(8)-QPSK (Quadrature Phase Shift Keying) transmitter. Here, "PRZ(8)" indicates that dips are applied every eight symbols by a pseudo-RZ scheme. A specific example of the configuration of transmitter 100 is next described with the bit rate of data signal 101 as 55 GHz.

Data signal 101 being a parallel signal, voltage signals 161 are 27.5 GHz electric signals that correspond to an I-(in-phase) component and Q-(quadrature) component, respectively, the I-component and Q-component being supplied in parallel to modulator 111. Modulator 111 is a QPSK modulator, and because one symbol is made up from two bits in QPSK, the frequency of the clock signal supplied from coder 120 to pseudo-RZ carver 112 is also 27.5 GHz. Pseudo-RZ carver 112 applies dips to the signal intensity every eight symbols. In other words, n=8 in this example.

Figure 12A:
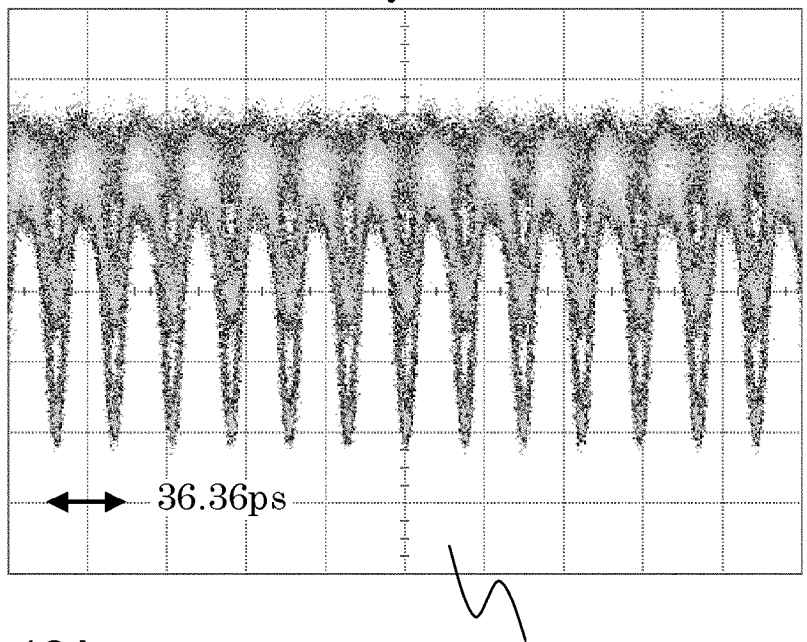
FIG. 12A is a waveform chart showing a 55-gigabit/second (Gb/s) NRZ-QPSK signal.

Graph 1110 of FIG. 12A shows the intensity waveform of optical signal 151 that has undergone QPSK modulation immediately after being supplied from modulator 111. At this stage, optical signal 151 is a signal of the NRZ form. The time of continuation of each symbol is shown as 36.36 ps (picoseconds). In contrast, the optical signal from pseudo-RZ carver 112 is shown by graph 1130 of FIG. 12C. A dip resulting from pseudo-RZ is shown by reference number 1131 in graph 1130. The spacing of 290.91 ps between dips in graph 1130 corresponds to the time of continuation of eight symbols.

In the example here described, optical signal 102 is a 55-Gb/s PRZ(8)-QPSK signal. In the graph, 55 Gb/s is indicated by "55G." The result of carrying out simulation for the intensity spectrum of this type of optical signal is shown in graph 1201 of FIG. 13A. The intensity peak in the vicinity of 28 GHz is seen by the clock component of the symbol rate, and the frequency component in the vicinity of 28 GHz is stronger by 30 dB or more compared to the surrounding frequency area. In addition, due to the addition of dips for every eight symbols by pseudo-RZ, intensity peaks are seen at one-eighth of the frequency of the symbol rate, i.e., 3.44 GHz, as well as at its harmonic frequencies. These intensity peaks are stronger by 20 dB or more than the surrounding frequency components.

Figure 13A:
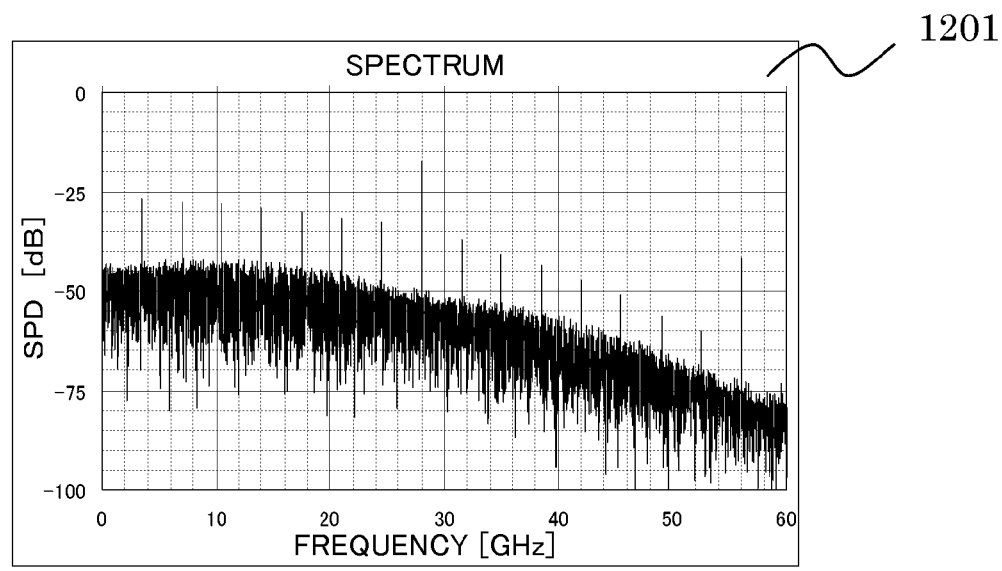
FIG. 13A is a graph showing the result of simulating an intensity spectrum of an NRZ-QPSK signal having a data rate of 56 Gb/s.
Figure 13B:
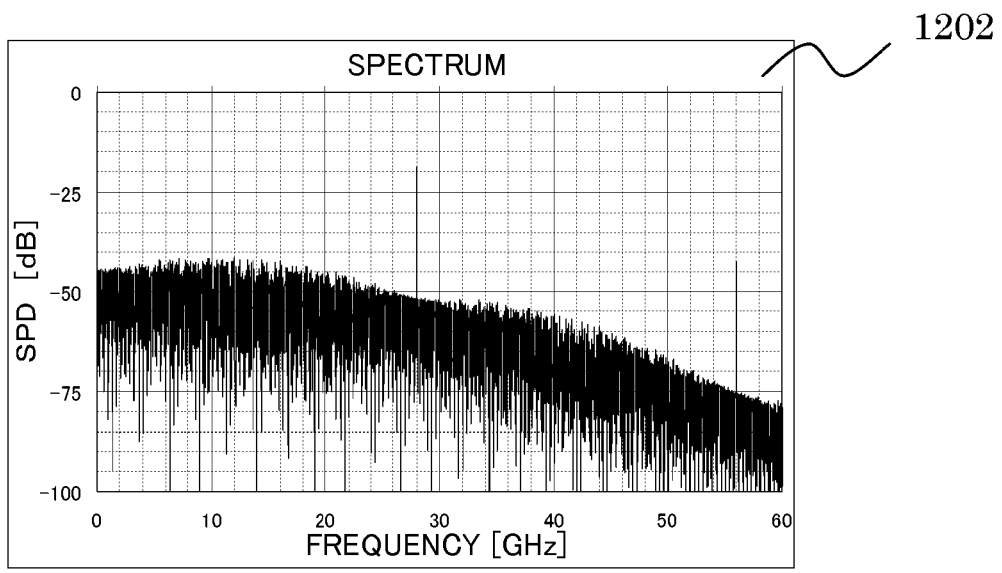
FIG. 13B is a graph showing the result of simulating the intensity spectrum of a PRZ-QPSK signal having a data rate of 56 Gb/s.

In contrast, graph 1202 of FIG. 13B shows the result of carrying out simulation for the intensity spectrum of a 56-Gb/s NRZ-QPSK signal. Here, a peak is observed in the vicinity of 28 GHz that corresponds to the symbol rate, but because there are no peaks in lower frequency areas, directly extracting and detecting a frequency component lower than 28 GHz from this signal is problematic.

Figure 13C:
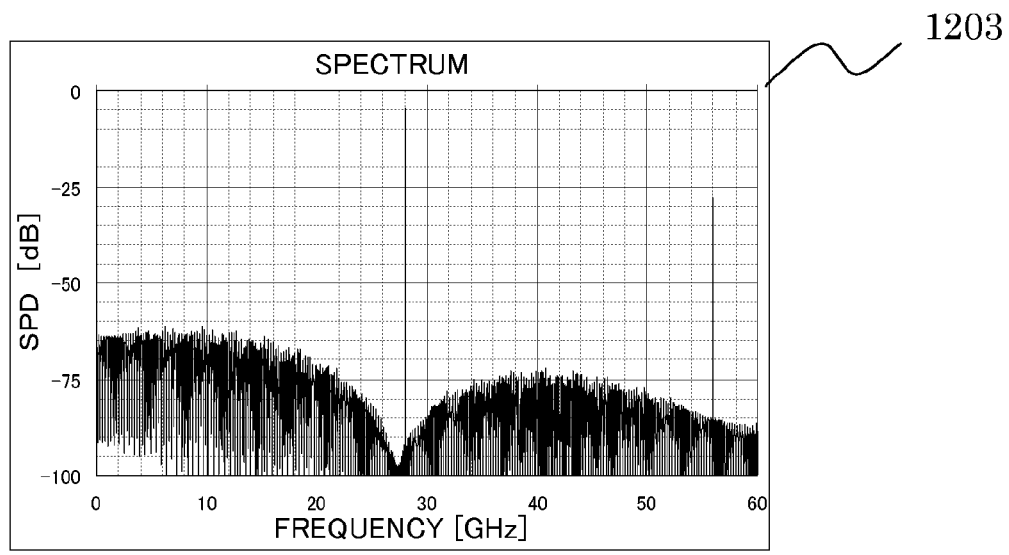
FIG. 13C is a graph showing the result of simulating the intensity spectrum of an RZ-QPSK signal having a data rate of 56 Gb/s.

In addition, graph 1203 of FIG. 13C shows the result of a simulation for the intensity spectrum of a 56-Gb/s RZ-QPSK signal according to the normal RZ format. In this case as well, a peak is observed in the vicinity of 28 GHz, but because there are no peaks in lower frequency areas, the direct extraction and detection of a frequency component lower than 28 GHz from this signal is problematic. In addition, although there is a peak in the vicinity of 28 GHz, the intensity in the frequency area in the vicinity of this peak is lower than in other frequency areas.

CD monitor 200 provided in the receiving end is next described. CD monitor 200 detects the frequency component that has been applied by pseudo-RZ modulation from an incident optical signal and generates electric signal 202 that indicates the chromatic dispersion value.

As shown in FIG. 3, CD monitor 200 includes: photodiode (PD) 210 that receives optical signal 201 applied as input and converts to electric signal 250; divider (DIV) 211 that branches electric signal 250 supplied from photodiode 210 to two signals 251 and 261; band-pass filter (BPF) 215 that receives signal 251; and monitor circuit 230 that calculates the chromatic dispersion value based on signal 261 and output signal 255 of band-pass filter 215. Optical signal 201 that comes into photodiode 210 that is a light-receiving element is an optical signal to which dips are applied by pseudo-RZ modulation on the transmitting side. Photodiode 210 supplies electric signal 250 that represents the intensity of optical signal 201, and this electric signal 250 is both supplied to monitor circuit 230 as signal 261 and supplied to band-pass filter 215 as signal 251 via divider 211. The branching ratio between the two signals 251 and 261 at divider 211 is set to a fixed value. Other types of light-receiving elements can also be used in place of a photodiode.

Band-pass filter 215 extracts from signal 251 a frequency component in which the frequency is represented by k*f/n, where k is a natural number equal to or greater than 1 and f is the frequency of clock signal 170 at transmitter 100, i.e., the symbol rate in optical signal 201, and generates signal 255 that indicates the intensity of the extracted frequency component. Here, n corresponds to the insertion of dips every n symbols by means of pseudo-RZ in transmitter 100. If frequencies of 1/n of the symbol rate f are referred to as dip frequencies, there are peaks at the dip frequencies and the harmonic frequencies in the intensity spectrum of optical signal 201, as described hereinabove. Band-pass filter 215 therefore extracts the dip frequencies (when k=1) or their $k^{th}$-order harmonic components (when k>1) in optical signal 201.

However, when the chromatic dispersion amount changes, the intensity ratio of the dip frequency component with respect to the entire optical signal 201 changes. This change of the intensity ratio with respect to the chromatic dispersion amount can be calculated by, for example, simulation. Conversely, the chromatic dispersion amount can be determined if the ratio of the intensity of the dip frequency component (or its harmonic component) with respect to the overall intensity of electric signal 250 that is generated by the reception of optical signal 201 can be found.

Here, monitor circuit 230 finds the ratio of the intensity of signal 255 that corresponds to the dip frequency component with respect to the intensity of signal 261 that corresponds to the entire band in optical signal 201, and based on the value of this ratio, calculates the chromatic dispersion value in the transmission of optical signal 201. In actuality, the chromatic dispersion value may be determined based on an intensity ratio calculated using a look-up table that is based on the simulation results. The look-up table is stored in a storage medium such as a nonvolatile semiconductor memory incorporated in monitor circuit 230. Of course, if it is known that the intensity of signal 261 is always a fixed value, or in other words, if it is known that the intensity of optical signal 201 is always fixed, the chromatic dispersion value can be calculated from only signal 255 without using signal 261. When the average power of optical signal 201 is not fixed, monitor circuit 230 uses signal 261 to calculate the average power of optical signal 201 and calculates the chromatic dispersion value based on this average power.

Figure 14A:
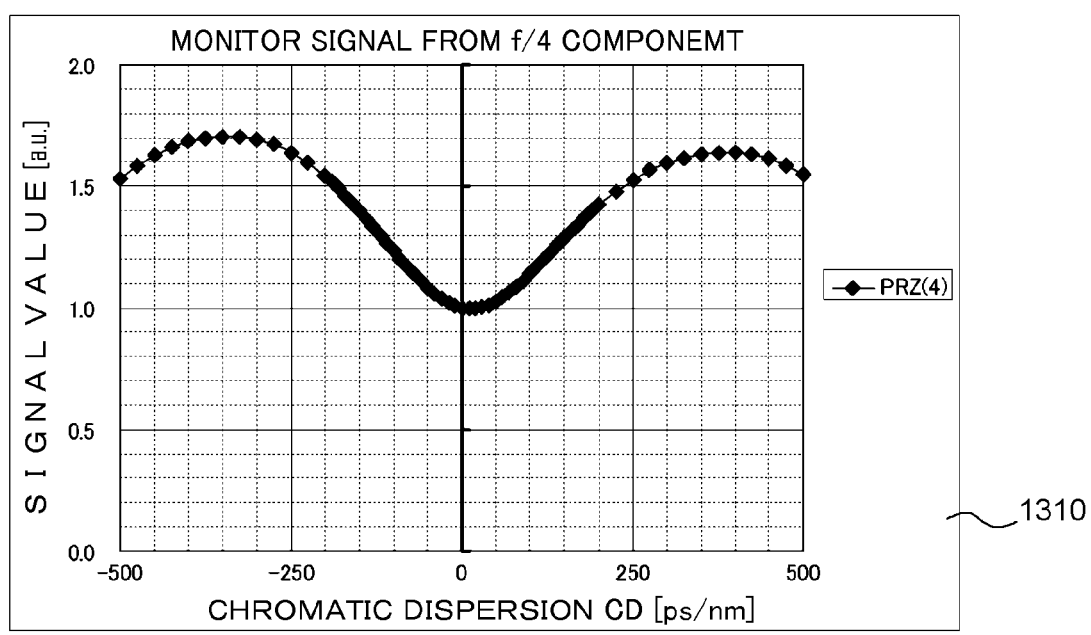
FIG. 14A is a graph showing the result of simulating how the intensity of a frequency component applied by pseudo-RZ modulation changes according to chromatic dispersion.

For example, if it is assumed that optical signal 201 is a 56-Gb/s PRZ(4)-QPSK signal, n=4 and symbol rate f is 28 GHz. Here, when k=1, i.e., when the fundamental wave component of the dip frequency is extracted by band-pass filter 215, CD monitor 200 finds the chromatic dispersion value by means of the frequency component of one-fourth the symbol rate and supplies signal 202 that represents this CD value. Graph 1310 of FIG. 14A shows the result of performing simulation that finds how the intensity ratio of the dip frequency component changes with respect to the value of the chromatic dispersion CD.

The intensity ratio undergoes monotone change when the chromatic dispersion is in the range of −400 to 0 ps/nm and further undergoes monotone change in the range of 0 to +400 ps/nm. Accordingly, if the absolute value of chromatic dispersion is unknown but the sign is known, monitor circuit 230 is able to monitor the chromatic dispersion within the broad range of ±400 ps/nm. In addition, the sign of chromatic dispersion can be found if the chromatic dispersion is intentionally changed in the positive or negative direction and the change in signal 202 is observed at this time, whereby the actual value of chromatic dispersion can be found by using monitor circuit 230.

Figure 4:
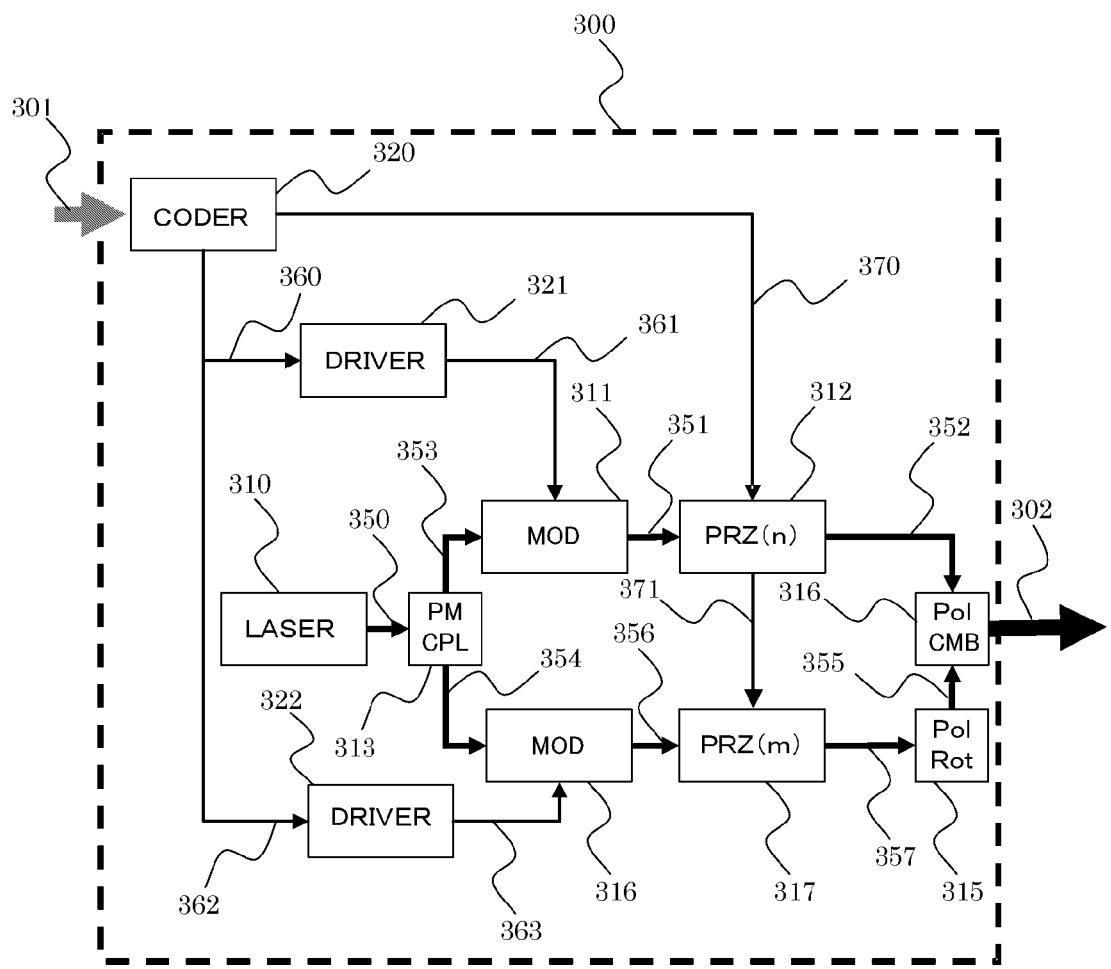
FIG. 4 is a block diagram showing the configuration of a transmitter in the second exemplary embodiment of the present invention.
Figure 5:
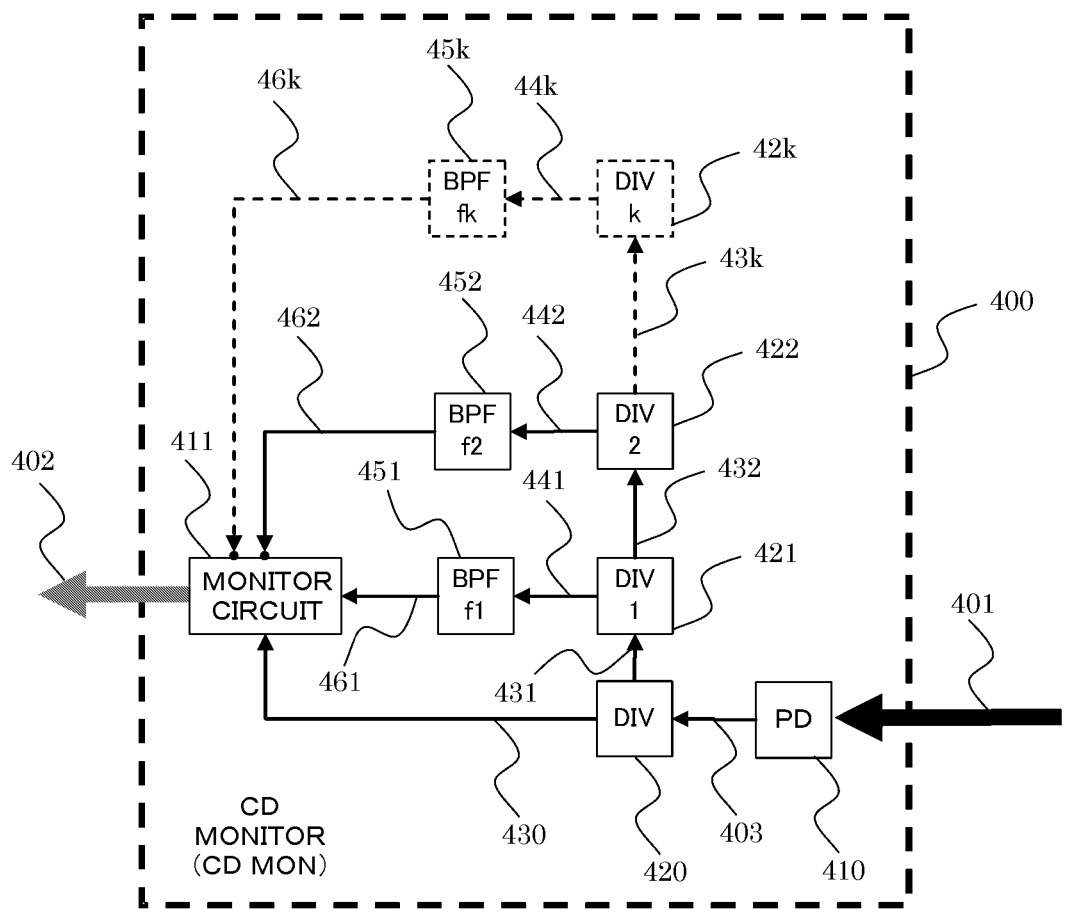
FIG. 5 is a block diagram showing the configuration of a CD monitor in the second exemplary embodiment of the present invention.

The second exemplary embodiment of the present invention is next described. The above-described first exemplary embodiment related to a case in which an optical signal of a single polarization is transmitted, but in the second exemplary embodiment, a case is described in which polarization-division multiplexing is used to transmit an optical signal. FIG. 4 shows the configuration of the transmitter that is used in the second exemplary embodiment and that supplies a polarization-division-multiplexed pseudo-RZ optical signal. FIG. 5 shows the configuration of a CD monitor that is the CD monitor used in the second exemplary embodiment, that receives a polarization-division-multiplexed pseudo-RZ optical signal and that detects a plurality of frequency components that are applied in a pseudo-RZ format to generate a signal that represents the chromatic dispersion value.

The configuration of transmitter 300 in the second exemplary embodiment is first described using FIG. 4.

Transmitter 300 supplies a polarization-division-multiplexed signal that has undergone pseudo-RZ modulation to add dips. Transmitter 300 includes: laser 310 that is the light source of optical carrier 350 that is originated; polarization-maintaining coupler (PM CPL) 313 that branches optical carrier 350 while maintaining polarization; modulator (MOD) 311 provided at one of the branches from polarization-maintaining coupler 313; pseudo-RZ carver (PRZ(n)) 312 that applies dips to optical signal 351 that has undergone modulation by modulator 311; modulator (MOD) 316 provided at the other branch from polarization-maintaining coupler 313; pseudo-RZ carver 317 that applies dips to optical signal 356 that has undergone modulation by modulator 316; polarization rotator (Pol Rot) 315 that rotates the polarization plane of signal light 357 supplied from pseudo-RZ carver 317; and polarization combiner (Pol CMB) 316 that combines optical signal 352 from pseudo-RZ carver 312 and optical signal 355 from polarization rotator 315 while maintaining polarization unchanged. Transmitter 300 further includes coder 320 and drivers 321 and 322 for modulation.

In this configuration, polarization-maintaining coupler 313 splits optical carrier 350 into two branches and generates optical carriers 353 and 354 having the same polarization state. Coder 320 generates digital data 360 and 362 for modulation for each polarization from an electric signal that indicates data to be transmitted, i.e., data signal 301, and drivers 321 and 322 convert each of digital data 360 and 362 to voltage signals 361 and 363, respectively, of appropriate voltages. Modulators 311 and 316 modulate optical carriers 353 and 354 based on voltage signals 361 and 363 to supply optical signals 351 and 356, respectively. Coder 320 supplies clock signals 370 and 371 of the same frequency as the symbol rate to pseudo-RZ carvers 312 and 317, respectively.

Both n and m are integers equal to or greater than 2 that mutually differ, pseudo-RZ carver 312 applies dips every n symbols to optical signal 351 by means of pseudo-RZ modulation, and pseudo-RZ carver 317 applies dips every m symbols to optical signal 356.

Polarization rotator 315 implements control to rotate the polarization of optical signal 357 such that the polarization of optical signal 357 from pseudo-RZ carver 317 is orthogonal to the polarization of optical signal 352 from pseudo-RZ carver 312 and to supply the result as optical signal 355. As a result, optical signal 352 and optical signal 355 have mutually orthogonal polarization states, and these signals are subjected to polarization-division-multiplexing by polarization combiner 316 and supplied as optical signal 302. Accordingly, optical signal 302 supplied as output by transmitter 300 is a signal that has undergone modulation by modulators 311 and 316 according to data signal 301, that has had pseudo-RZ dips applied to each polarization every n or m symbols by pseudo-RZ carvers 312 and 317, and then subjected to polarization-division-multiplexing.

In the configuration shown in FIG. 4, transmitter 300 is a 110-Gb/s PRZ(4, 8)-QPSK transmitter. A specific example of the configuration of transmitter 300 is next described in which the data rate of data signal 301 is 110 GHz, n=8, and m=4.

Data signal 301 being a parallel signal, electric signal 361 is a 27.5 GHz electric signal composed of an I-component signal and Q-component signal that corresponds to one polarization, and similarly, electric signal 363 is a 27.5 GHz electric signal composed of an I-component signal and a Q-component signal that correspond to the other polarization. Each of modulators 311 and 316 is a QPSK modulator that takes the I-component signal and Q-component signal as input. Clock signals 370 and 371 that both have frequency of 27.5 GHz are supplied to pseudo-RZ carvers 312 and 317 from coder 320.

Pseudo-RZ carver 312 applies dips to the intensity of optical signal 351 every eight symbols and pseudo-RZ carver 317 applies dips to the intensity of optical signal 356 every four symbols. The intensity waveform of optical signals 351 and 356 that have undergone QPSK modulation by modulators 311 and 316 is shown in graph 1110 of the above-described FIG. 12A. In addition, the intensity waveform of optical signal 352 from pseudo-RZ carver 312 is shown by graph 1130 of FIG. 12C, and a dip in this waveform is indicated by reference number 1121. The intensity waveform of optical signal 355 from pseudo-RZ carver 317 is shown by graph 1120 of FIG. 12B, and a dip in this waveform is indicated by reference number 1121.

Figure 12B:
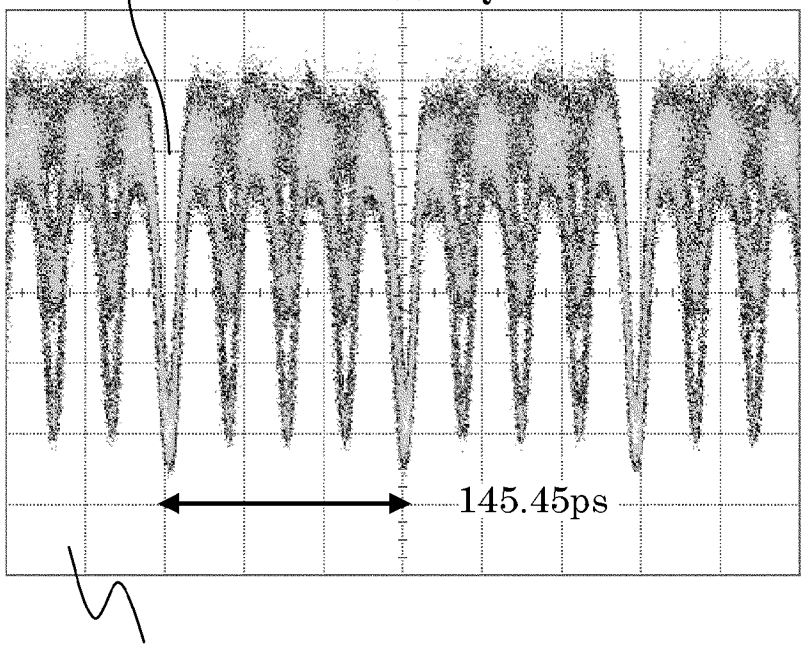
FIG. 12B is a waveform chart showing the waveform of a 55-Gb/s pseudo-RZ-QPSK signal.
Figure 12C:
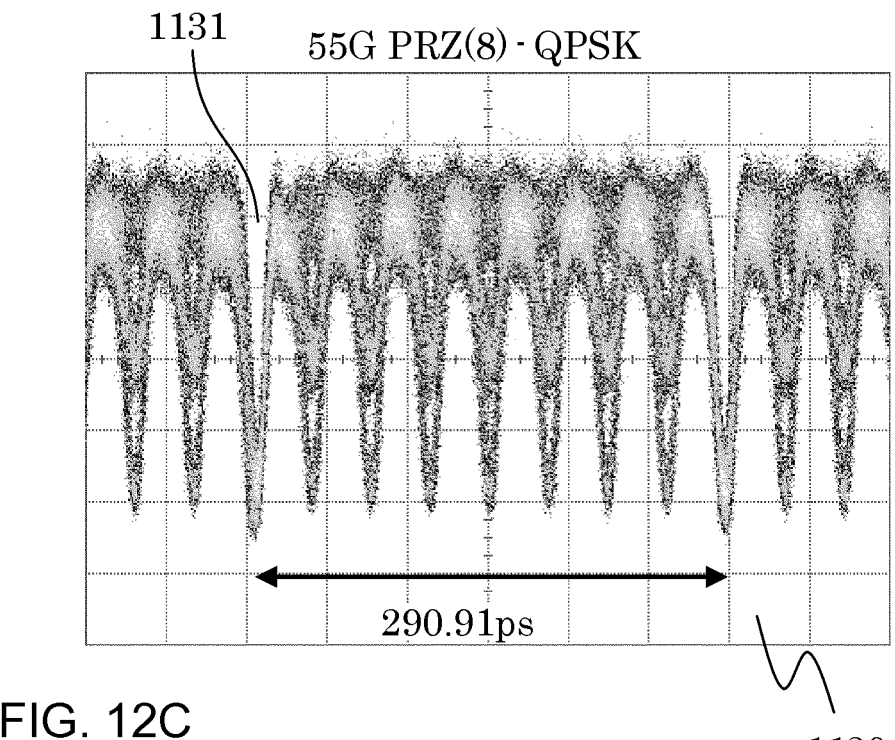
FIG. 12C is a waveform chart showing the waveform of a 55-Gb/s pseudo-RZ-QPSK signal.
Figure 12D:
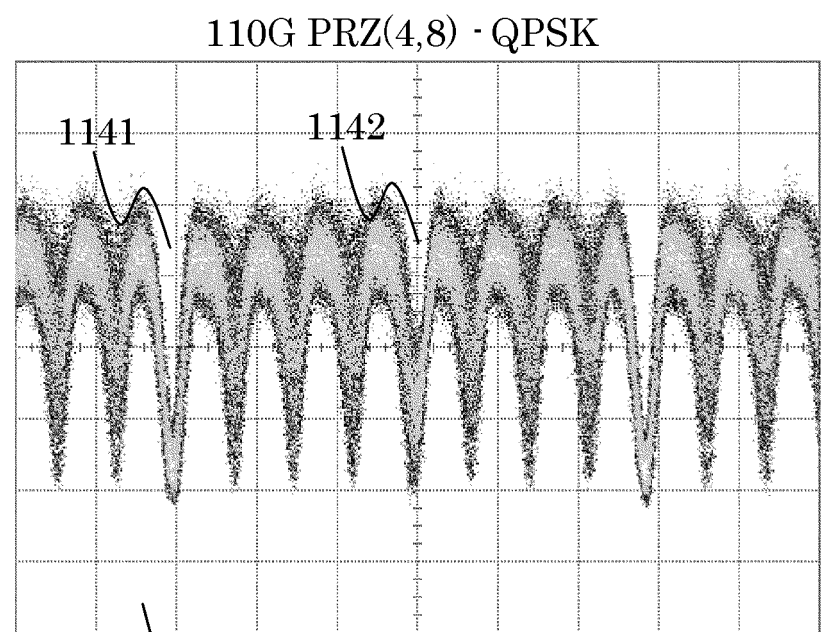
FIG. 12D is a waveform chart showing the waveform of a 110-Gb/s pseudo-RZ-QPSK signal.

The two optical signals 351 and 356 for which intensity waveforms are shown by graph 1120 of FIG. 12B and graph 1130 of FIG. 12C, respectively, undergo polarization-division-multiplexing to generate polarization-division-multiplexed signal 302, whereby the intensity waveform of polarization-division-multiplexed signal 302 becomes as shown by graph 1140 of FIG. 12D. In graph 1140, reference number 1141 indicates a deep dip that results from the coincidence of the dip (PRZ(4)) for every four symbols and dip (PRZ(8)) for every eight symbols, and reference number 1142 indicates a dip for every four symbols.

The configuration of the CD monitor in the second exemplary embodiment is next described using FIG. 5.

CD monitor (CD MON) 400 detects a plurality of frequency components that have been applied by pseudo-RZ modulation from incident optical signal 401 and generates an electric signal that represents the chromatic dispersion value. Optical signal 401 is a signal to which dips have been added based on a pseudo-RZ format, and, for example, is an optical signal generated by transmitter 300 shown in FIG. 4 and transmitted on a transmission path such as an optical fiber. Optical signal 401 may be a signal generated by a transmitter other than the transmitter shown in FIG. 4 as long as it is a signal to which dips have been applied by pseudo-RZ according to a plurality of frequency components.

CD monitor 400 includes: photodiode 410 which receives optical signal 401 and converts this optical signal to an electric signal; k+1 pieces of dividers 420 to 42k; k pieces of band-pass filters 451 to 45k; and monitor circuit 411 that actually generates an electric signal that represents the CD measurement value, where k is an integer equal to or greater than 2. The parameter k indicates the number of types of frequency components by which dips have been applied to optical signal 401. Band-pass filters 451 to 45k each extract a component of mutually different frequencies f1 to fk. In the following description, each of components of frequencies f1 to fk are referred to as the f1 frequency component to the fk frequency component, respectively.

When optical signal 401 is received and photodiode 410 that is a light-receiving element issues electric signal 403 that indicates the intensity of optical signal 401, this electric signal 403 is applied to the initial-stage divider (DIV) 420 and branched into signal 430 and signal 431. Signal 430 is conferred directly to monitor circuit 411. In contrast, signal 431 is applied to the next divider (DIV1) 421 and branched into signal 441 and signal 432.

Signal 441 is supplied to band-pass filter 451, and band-pass filter 451 extracts the f1 frequency component from signal 441 and generates signal 461 that indicates the intensity of this component. Frequency f1 is the frequency of the dips applied by means of pseudo-RZ in signal 401. On the other hand, signal 432 is applied as input to the next divider (DIV2) 422 and branched into signal 442 and signal 433. Of these, signal 442 is supplied to band-pass filter 452 and signal 433 is further applied as input to the next divider (DIV3) 423. Band-pass filter 452 extracts the f2 frequency component from signal 442 and generates signal 462 that represents the intensity of this component. Frequency f2 is the frequency of the dips applied by pseudo-RZ in signal 401.

Last-stage divider 42k similarly receives signal 43k, extracts the fk frequency component and supplies signal 44k to $k^{th}$ band-pass filter 45k that generates signal 46k that represents the intensity of this component. Because there is no divider following divider 42k, signal 43k may be directly supplied to band-pass filter 45k as signal 46k without providing last-stage divider 42k.

By means of the above-described configuration, electric signals 461 to 46k that represent the intensities of each of the f1 frequency component to the fk frequency component are generated, and these electric signals are supplied to monitor circuit 411 together with signal 430.

Monitor circuit 411 calculates the chromatic dispersion value in the transmission of optical signal 401 based on the ratio of the intensities of signals 461 to 46k with respect to the intensity of signal 430. The chromatic dispersion values are preferably found through, for example, the use of a look-up table, rather than by actually carrying out computations. The principle for finding the chromatic dispersion values in this case is similar to the case of the first exemplary embodiment. In addition, when the average power of optical signal 401 is not fixed, monitor circuit 411 can eliminate the dependency of reception power in the calculation of chromatic dispersion values by using signal 430 to calculate the average power of optical signal 401 and then using the calculated average power and the intensities of signals 461 to 46k. Of course, if it is known that the reception power of optical signal 401 is always fixed, the chromatic dispersion value can be determined from the intensities of signals 461 to 46k without using signal 430.

For example, if optical signal 401 is assumed to be a polarization-division-multiplexed 112-Gb/s PRZ(4, 8)-QPSK signal, symbol rate f is f=28 GHz, whereby f1=f/4 can be selected and f2=f/8 can be selected. In other words, it can be assumed that dips are inserted every four symbols, and further, that dips are inserted every eight symbols so as to be realized by the transmitter shown in FIG. 4. The result of simulating the change with respect to chromatic dispersion of the f1 frequency component and the f2 frequency component in this case is shown in FIGS. 14A to 14E.

Figure 14B:
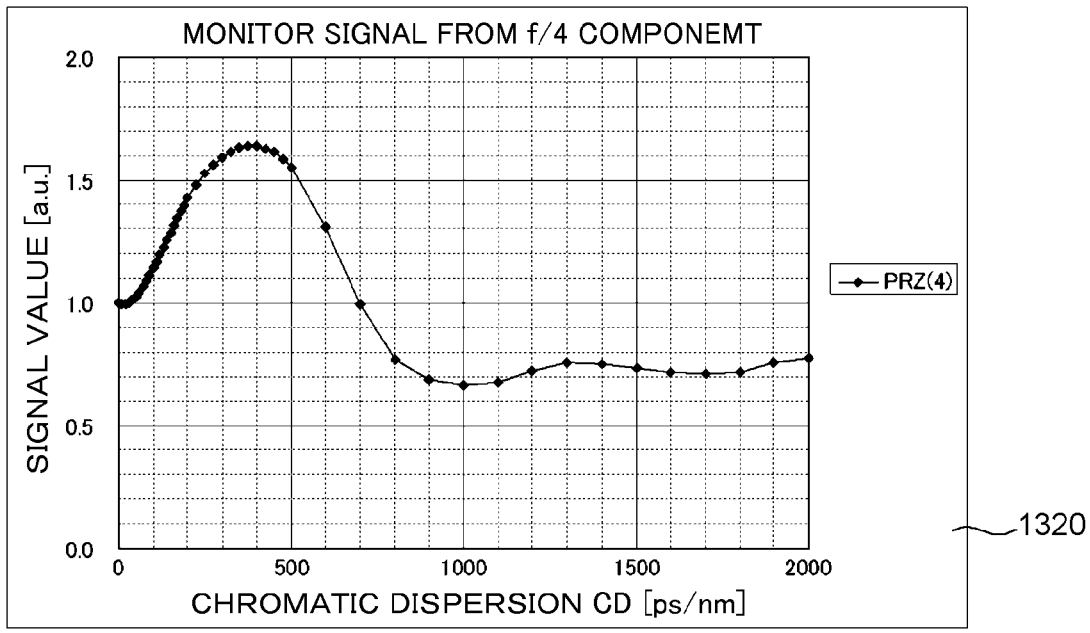
FIG. 14B is a graph showing the result of simulating how the intensity of a frequency component applied by pseudo-RZ modulation changes according to chromatic dispersion.
Figure 14C:
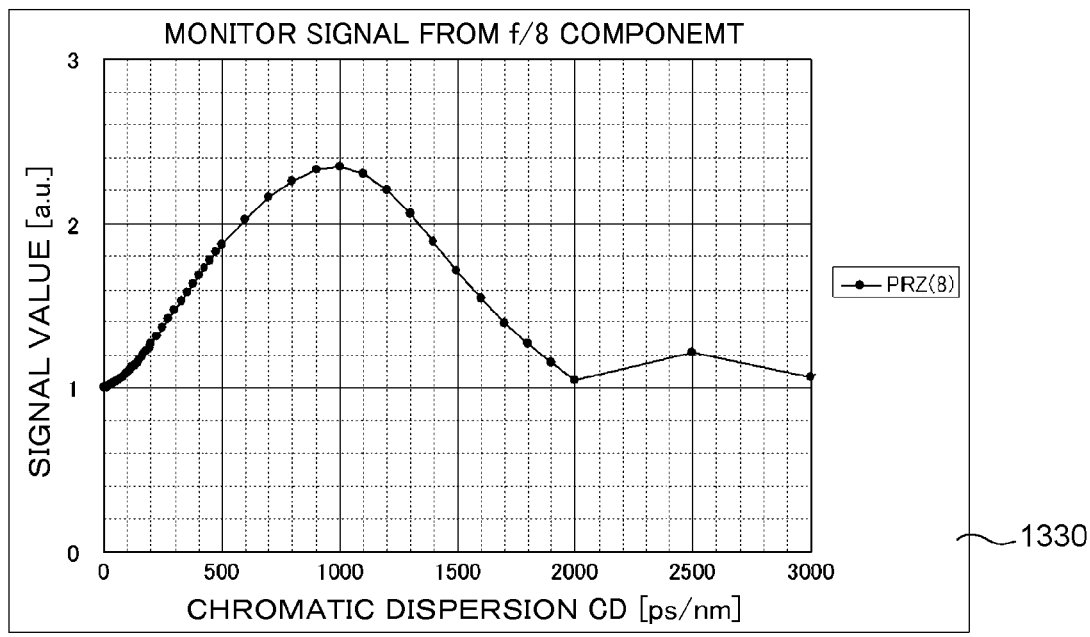
FIG. 14C is a graph showing the result of simulating how the intensity of a frequency component applied by pseudo-RZ modulation changes according to chromatic dispersion.

Graph 1320 of FIG. 14B shows how the intensity ratio of signal 461 of the f1 frequency component with respect to signal 430 changes with respect to chromatic dispersion, and graph 1330 of FIG. 14C shows how the intensity ratio of signal 462 of the f2 frequency component with respect to signal 430 changes with respect to chromatic dispersion.

When it is known whether the sign of the chromatic dispersion amount is positive or negative, change in the intensity ratio of signal 462 is monotone, whereby signal 462 can be used in the detection of chromatic dispersion of the wide range of ±1000 ps/nm and the chromatic dispersion can be monitored. When chromatic dispersion is within the range of ±400 ps/nm, graph 1320 that indicates larger amount of change with respect to chromatic dispersion can be used to monitor chromatic dispersion with still higher accuracy.

When the chromatic dispersion is within the range of ±400 ps/nm, the result shown in graph 1320 relating to the f1 frequency component and the result according to graph 1330 relating to the f2 frequency component may both be used and monitor circuit 411 may generate electric signal 402 that represents a highly accurate chromatic dispersion value based on a look-up table that uses these two results.

Figure 14D:
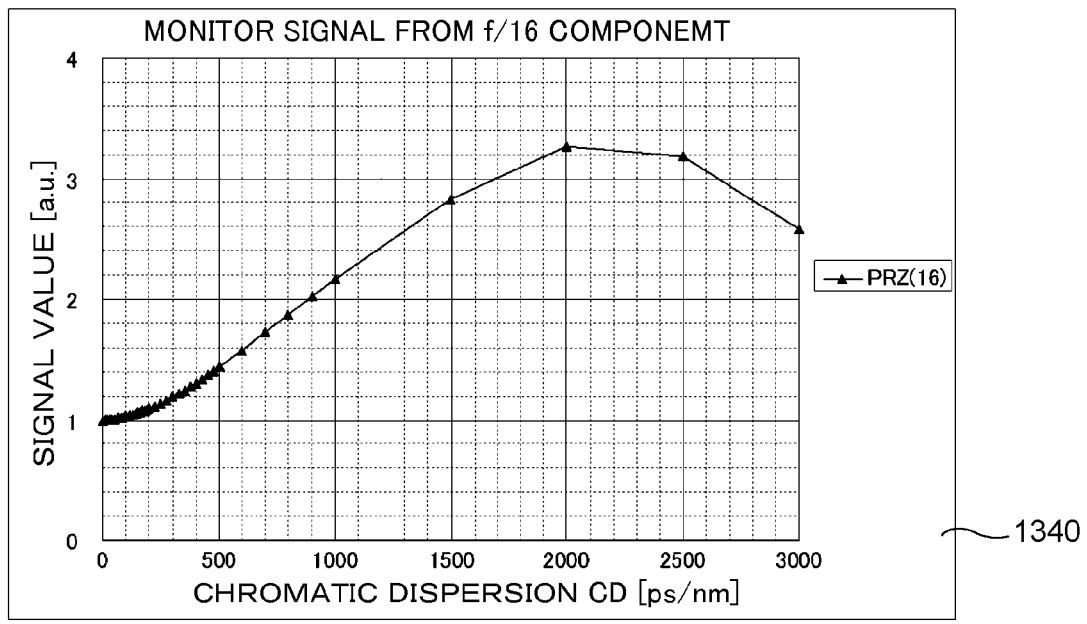
FIG. 14D is a graph showing the result of simulating how the intensity of a frequency component applied by pseudo-RZ modulation changes according to chromatic dispersion.

When monitoring chromatic dispersion in a still broader range of ±2000 ps/nm, as can be seen from graph 1340 of FIG. 14D that shows the simulation result, the chromatic dispersion should be found from the intensity of the f3 frequency component using optical signal 401 that applies pseudo-RZ (16), i.e., using optical signal 401 in which dips are applied every 16 symbols with f3=f/16. In this case, signal 402 supplied from monitor circuit 411 can represent chromatic dispersion up to ±2000 ps/nm.

Figure 14E:
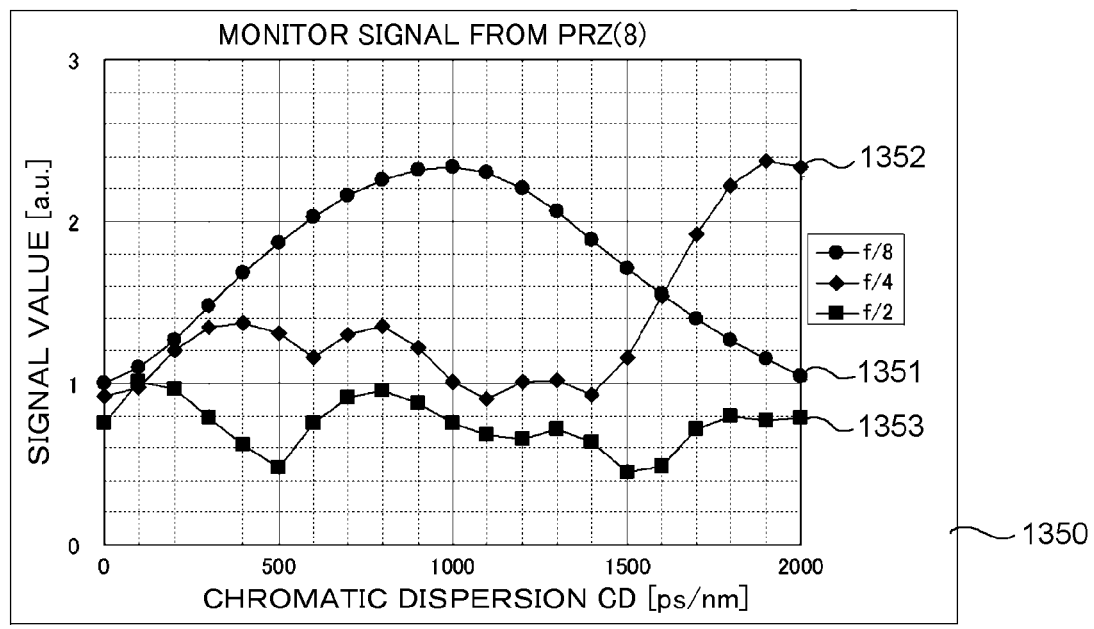
FIG. 14E is a graph showing the result of simulating how the intensity of a frequency component applied by pseudo-RZ modulation changes according to chromatic dispersion.

As another example, if optical signal 401 is 56-Gb/s PRZ(8)-QPSK, the symbol rate becomes f=28 GHz, whereby at this time f1=f/8 can be selected as the f1 frequency component that corresponds to signal 461, f2=f/4 can be selected corresponding to signal 462, and f3=f/2 can be selected corresponding to signal 463. Graph 1350 of FIG. 14E shows the simulation result for the intensity of these signals 461 to 463 for chromatic dispersion. Curve 1351 shows the results for signal 461, curve 1352 shows the results for signal 462, and curve 1353 shows the simulation results for signal 463.

When the sign of the chromatic dispersion is known, using signal 461 results in monotone change of the signal intensity with respect to chromatic dispersion, whereby chromatic dispersion can be monitored over the broad range of ±1000 ps/nm. When chromatic dispersion is within the range of ±400 ps/nm, chromatic dispersion can be monitored by using signal 462, and when chromatic dispersion is within the range of ±100 ps/nm, chromatic dispersion can be monitored using signal 463.

Figure 6:
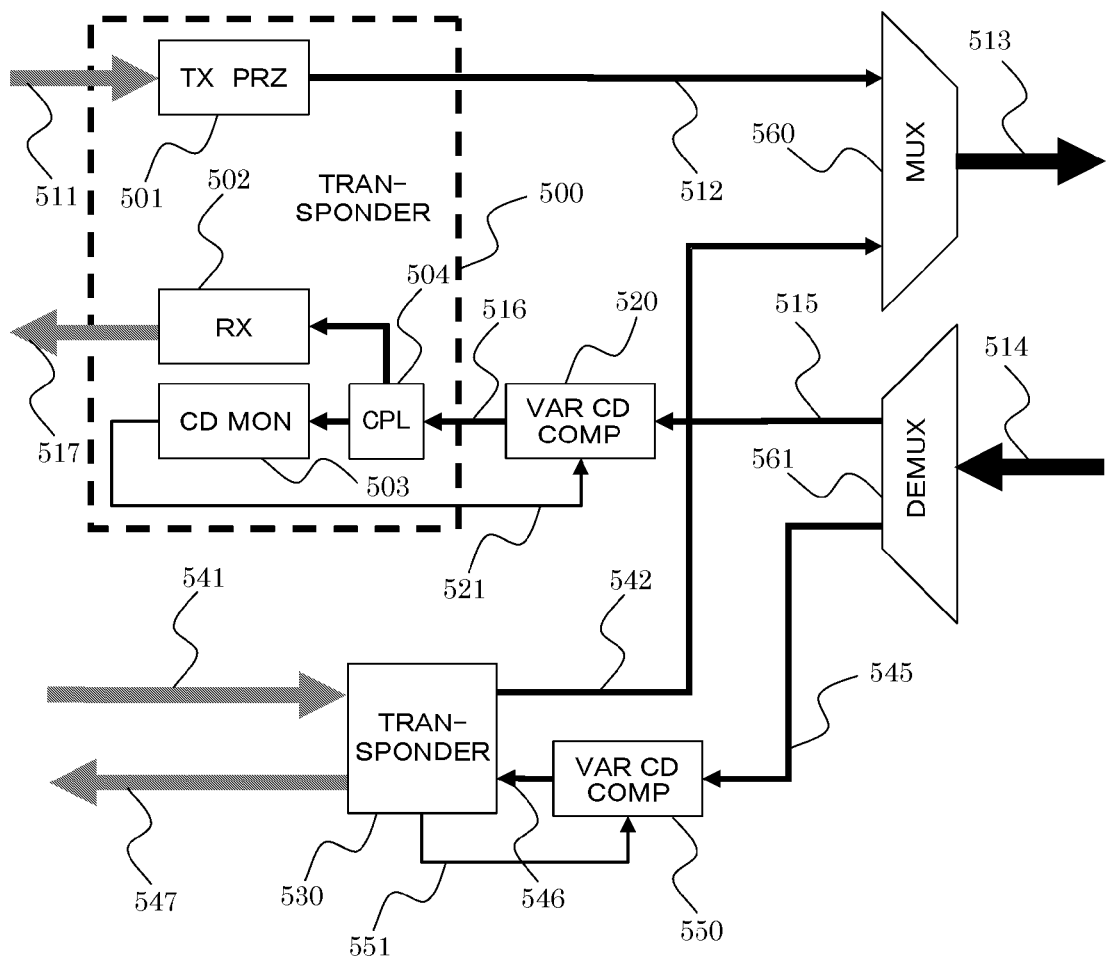
FIG. 6 is a block diagram showing an example of the configuration of the optical transmission and reception system that carries out automatic chromatic dispersion equalization for each wavelength channel according to the third exemplary embodiment of the present invention.

The third exemplary embodiment of the present invention is next described. Here, an optical transmission and reception system is described in which chromatic dispersion is detected by means of the monitor method as described above, and based on the detection result, the execution of automatic chromatic dispersion equalization is enabled for each wavelength channel. FIG. 6 shows the optical transmission and reception system in the third exemplary embodiment.

Transponder 500 includes: transmission unit (TX PRZ) 501; reception unit (RX) 502; CD monitor (CD MON) 503; and coupler (CPL) 504. Transmission unit 501 modulates an optical carrier by means of electric signal 511 that indicates the data to be transmitted, and further, applies dips, by means of pseudo-RZ, in the intensity of the carrier to the optical carrier after the modulation, and transmits optical signal 512. Transmitter 100 that was described using FIG. 2 or transmitter 300 that was described using FIG. 4 can be used as this transmission unit 501.

Optical signal 516 received by transponder 500 is split into two branches by coupler 504, one branch being distributed to reception unit 502 and the other being distributed to CD monitor 503. Optical signal 516 is here assumed to have had dips applied every n symbols by pseudo-RZ modulation. Reception unit 502 receives the incident optical signal and demodulates the signal to convert to electric signal 517. CD monitor 503 monitors the chromatic dispersion of the received optical signal and generates an electric signal that indicates the value of the chromatic dispersion, i.e., monitor signal 521. As CD monitor 503, CD monitor 200 that was described using FIG. 3 or CD monitor 400 that was described using FIG. 5 can be used.

Further, in this transmission and reception system, transponder 530 that is a device similar to transponder 500 is provided. However, transponder 530 supplies optical signal 542 of a wavelength that differs from optical signal 512, based on electric signal 541 that indicates data to be transmitted. In addition, the wavelength of optical signal 546 that this transponder 530 receives is different from that of optical signal 516. Based on received optical signal 546, transponder 530 both generates electric signal 547 that indicates the received data and supplies monitor signal 551 that represents the chromatic dispersion contained in optical signal 546.

Optical multiplexer (MUX) 560 that subjects optical signals 512 and 542 transmitted from transponders 500 and 530, respectively, to wavelength-multiplexing is further provided, and optical signal 513 that has undergone wavelength-multiplexing is transmitted to the transmission path. Many transponders may be further provided, and the optical signals from these transponders may be subjected to wavelength-multiplexing in optical multiplexer 560.

Optical signal 514 that is produced in a transponder similar to transponders 500 and 530 and subjected to wavelength-multiplexing is sent from the transmission path. Optical demultiplexer (DEMUX) 561 that separates optical signal 514 by wavelength is provided, and optical signals 515 and 545 that have been separated by respective wavelengths pass through variable chromatic dispersion equalizer (VAR CD COMP) 520 and 550 and thus equalized, and finally received by multiplexers 500 and 530 as optical signals 516 and 546, respectively. Here, variable chromatic dispersion equalizer 520 is controlled by monitor signal 521 from multiplexer 500, and variable chromatic dispersion equalizer 550 is controlled by monitor signal 551 from multiplexer 530.

Specific examples of the optical transmission and reception system shown in FIG. 6 are next described.

In the first example, transmission unit 501 of transponder 500 is of the same configuration as transmitter 100 according to pseudo-RZ modulation shown in FIG. 2 and produces a 56-Gb/s PRZ(8)-QPSK signal. In addition, CD monitor 503 is of the same configuration as CD monitor 200 shown in FIG. 3, and is set to f/n=f/8 with the frequency of the symbol rate as f. Transponder 530 may also be configured from a similar transmitter and CD monitor.

Variable chromatic dispersion equalizer 520 is controlled such that monitor signal 521 that indicates chromatic dispersion is minimized. As shown in graph 1330 of FIG. 14C, if residual chromatic dispersion in optical signal 515 from demultiplexer 561 is within ±1000 ps/nm, the amount of CD can be determined accurately, and by controlling variable chromatic dispersion equalizer 520 based on this amount of CD, the residual chromatic dispersion in the optical signal that is received by reception unit 502 can be made zero. Accordingly, the quality of data signal 517 supplied from reception unit 502 is optimized. Data signal 517 in this case is an electric signal. In addition, even if the chromatic dispersion should change during transmission in optical signal 514 from the transmission path, the residual chromatic dispersion in optical signal 515 can be equalized. The residual chromatic dispersion in optical signal 545 can also be equalized by executing similar control over variable chromatic dispersion equalizer 550.

In the second example, transmission unit 501 of transponder 500 is of the same configuration as transmitter 100 according to pseudo-RZ modulation that was shown in FIG. 2 and produces a 56-Gb/s PRZ(8)-QPSK signal. CD monitor 503 is of the same configuration as CD monitor 400 shown in FIG. 5 and is set to f1=f/8, f2=f/4, and f3=f/2. Transponder 530 may also be configured from a similar transmitter and CD monitor.

In this case as well, variable chromatic dispersion equalizer 520 is controlled such that monitor signal 521 that indicates chromatic dispersion is minimized. As shown by graph 1350 of FIG. 14E, if the residual chromatic dispersion in optical signal 515 is within ±1000 ps/nm, the amount of CD can be determined accurately, the residual chromatic dispersion in the optical signal received by reception unit 502 can be made zero through the control of variable chromatic dispersion equalizer 520 based on this amount of CD, and the quality of data signal 517 can be optimized. In order to execute this type of control, information from the f1 frequency component is used in the initial stage of control to generate monitor signal 521 and the residual chromatic dispersion is first suppressed to within ±400 ps/nm. Next, monitor signal 521 is generated based on information from the f2 frequency component to suppress the chromatic dispersion to ±100 ps/nm. Then, using information from the f3 frequency component, minute change in the residual chromatic dispersion is tracked to enable highly accurate compensation of the chromatic dispersion. The adoption of range switching of this type enables the selection of the optimum dynamic range for equalizing chromatic dispersion. In addition, the residual chromatic dispersion in optical signal 515 can be equalized even when there is change in the chromatic dispersion over time in optical signal 514 received from the transmission path. The residual chromatic dispersion in optical signal 545 can be equalized through the execution of similar control over variable chromatic dispersion equalizer 550.

In the third example, transmission unit 501 of transponder 500 is of the same configuration as polarization-division-multiplexing pseudo-RZ transmitter 300 that was shown in FIG. 4 and generates a polarization-division-multiplexed 112-Gb/s PRZ(4, 8)-QPSK signal. CD monitor 503 is of the same configuration as the CD monitor 400 shown in FIG. 5 and is set to f1=f/8 and f2=f/4. Transponder 530 may also be configured from a similar transmitter and CD monitor.

In this case as well, variable chromatic dispersion equalizer 520 is controlled such that monitor signal 521 that indicates the chromatic dispersion is minimized. As shown by graph 1350 of FIG. 14E, if the residual chromatic dispersion in optical signal 515 is within ±1000 ps/nm, the amount of CD can be accurately determined, the residual chromatic dispersion can be made zero, and the quality of data signal 517 can be optimized. In order to execute this type of control, information from the f1 frequency component is used in the initial stage of control to generate monitor signal 521 and the residual chromatic dispersion is first suppressed to within ±400 ps/nm. Monitor signal 521 is then generated based on information from the f2 frequency component to carry out finer control. The adoption of this type of range switching enables selection of the optimum dynamic range. Equalization of the residual chromatic dispersion in optical signal 515 can be realized even if the chromatic dispersion should change over time in optical signal 514 received from the transmission path. The residual chromatic dispersion in optical signal 545 can also be equalized by implementing similar control over variable chromatic dispersion equalizer 550.

Figure 7:
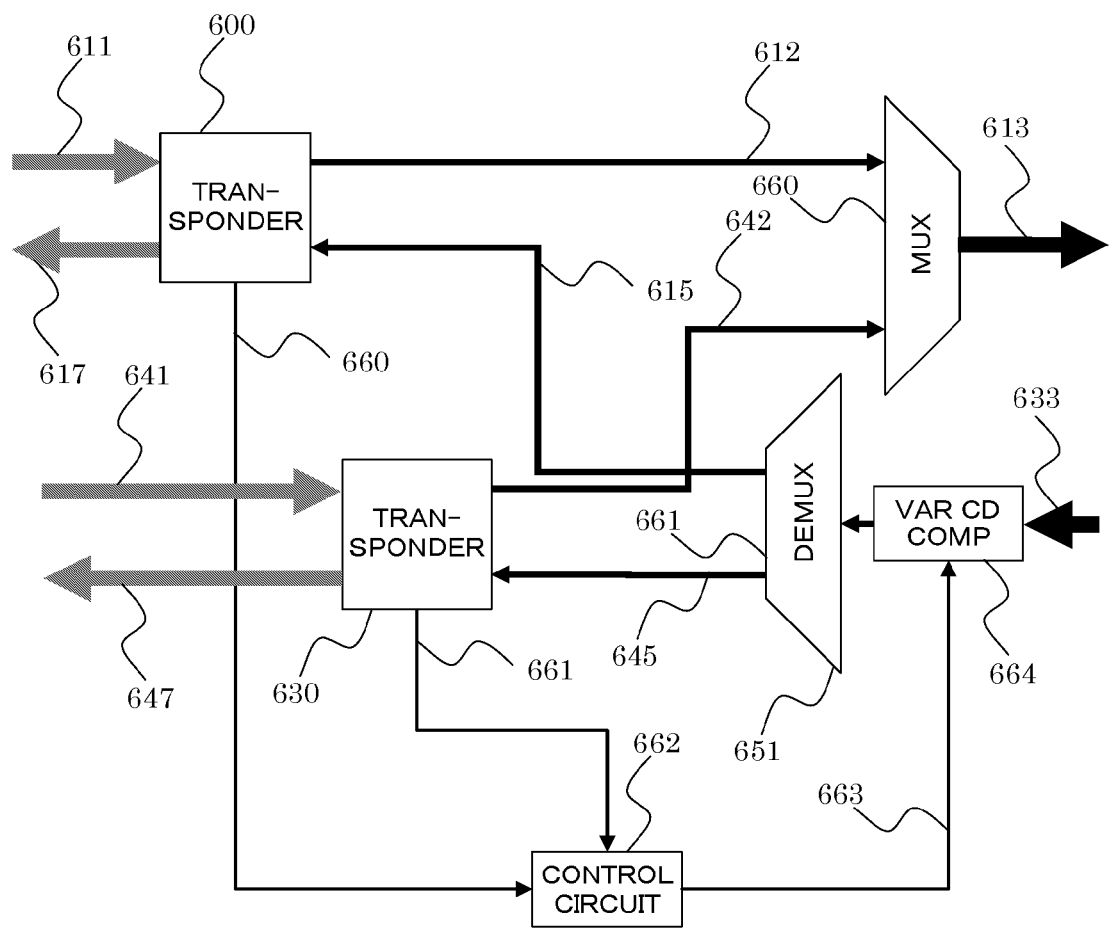
FIG. 7 is a block diagram showing an example of the configuration of the optical transmission and reception system that carries out automatic chromatic dispersion equalization for a plurality of wavelength channels collectively according to the fourth exemplary embodiment of the present invention.

The fourth exemplary embodiment of the present invention is next described. An optical transmission and reception system is here described that is capable of detecting chromatic dispersion by the monitor method such as described hereinabove, and based on this detection result, implementing automatic equalization of chromatic dispersion collectively for a plurality of wavelength channels. FIG. 7 shows the optical transmission and reception system in the fourth exemplary embodiment.

Transponder 600 is of the same configuration as transponder 500 that was shown in FIG. 6 and modulates an optical carrier by electric signal 611 that indicates data to be transmitted to a partner, applies dips in the intensity of the carrier by means of pseudo-RZ to the modulated optical carrier, transmits optical signal 612, and finally, receives optical signal 615 from the partner side to supply data signal 617 as an electric signal. Monitor signal 660 that indicates the measured CD value is also supplied from transponder 600. In addition, transponder 630 that is a device similar to transponder 600 is also provided. However, transponder 630 supplies, based on electric signal 641 that indicates data to be transmitted, optical signal 642 of a wavelength that differs from optical signal 612. In addition, transponder 630 receives optical signal 645 in which the wavelength differs from that of optical signal 615, and based on this optical signal 645, both generates electric signal 647 that indicates the received data and supplies monitor signal 661 that represents the chromatic dispersion contained in optical signal 645.

Optical multiplexer (MUX) 660 is provided that subjects optical signals 612 and 642 transmitted from transponders 600 and 630, respectively, to wavelength-multiplexing, and the wavelength-multiplexed optical signal 613 is transmitted to the transmission path. Many transponders may be further provided and the optical signals from these transponders may be subjected to wavelength-multiplexing in optical multiplexer 660.

Optical signal 633 that has been generated by a transponder similar to transponders 600 and 630 and subjected to wavelength-multiplexing is transmitted from the transmission path. Optical demultiplexer (DEMUX) 661 is provided that separates optical signal 633 by wavelength, and optical signals 615 and 645 that have been separated by wavelength are received by multiplexers 600 and 630, respectively.

In this exemplary embodiment, variable chromatic dispersion equalizer (VAR CD COMP) 664 is provided between demultiplexer 651 and the transmission path, and optical signal 633 from the transmission path undergoes compensation of chromatic dispersion in groups relating to a plurality of wavelength channels by passing through variable chromatic dispersion equalizer 664. This type of variable chromatic dispersion equalizer 664 can employ a device such as is disclosed in S. Sohma, et al., "40λ WDM Channel-by-Channel and Flexible Dispersion Compensation at 40 Gb/s Using Multi-channel and Flexible Dispersion Compensator," ECOC 2009, paper 3.3.1 (2009)) [NPL3].

Control circuit 662 is provided to control variable chromatic dispersion equalizer 664. Control circuit 662 controls variable chromatic dispersion equalizer 664 by means of control signal 663 such that the residual chromatic dispersion in both the wavelength of the received optical signal of transponder 600 and the wavelength of the received optical signal of transponder 630 become zero based on monitor signal 660 from transponder 600 and monitor signal 661 from transponder 630.

Specific examples of the optical transmission and reception system shown in FIG. 7 are next described.

In the first example, the transmission unit of transponder 600 is of the same configuration as transmitter 100 according to pseudo-RZ modulation shown in FIG. 2 and produces a 56-Gb/s PRZ(16)-QPSK signal. The CD monitor of transponder 600 is of the same configuration as CD monitor 200 shown in FIG. 3, and f/n=f/16 is set with the frequency of the symbol rate being f. Transponder 630 may also be configured from a similar transmitter and CD monitor.

In this case, control circuit 662 generates control signal 663 such that monitor signal 661 that indicates chromatic dispersion is minimized to control variable chromatic dispersion equalizer 664. From graph 1340 of FIG. 14D, if the residual chromatic dispersion in optical signal 615 is within ±2000 ps/nm, the amount of CD can be determined accurately, and by controlling variable chromatic dispersion equalizer 664 based on this amount of CD, the residual chromatic dispersion can be made zero and the quality of data signal 617 can be optimized. In addition, the residual chromatic dispersion in optical signal 615 can be equalized even if the chromatic dispersion should change during transmission in optical signal 633 from the transmission path. The residual chromatic dispersion in optical signal 645 can also be equalized by implementing similar control.

In the second example, the transmission unit of transponder 600 is of the same configuration as transmitter 100 according to pseudo-RZ modulation shown in FIG. 2 and produces a 56-Gb/s PRZ(8)-QPSK signal. The CD monitor of transponder 600 is of the same configuration as CD monitor 400 shown in FIG. 5 and is set to f1=f/8, f2=f/4, and f3=f/2. Transponder 630 may also be configured from a similar transmitter and CD monitor.

In this case as well, variable chromatic dispersion equalizer 664 is controlled such that monitor signal 660 is minimized. As shown by graph 1350 of FIG. 14E, if the residual chromatic dispersion in optical signal 615 is within ±1000 ps/nm, the amount of CD can be accurately determined, the residual chromatic dispersion can be made zero, and the quality of data signal 617 can be optimized. In order to implement this type of control, information from the f1 frequency component is used to generate monitor signal 660 in the initial stage of control and the residual chromatic dispersion is first suppressed to within ±400 ps/nm. Monitor signal 660 is next generated based on information from the f2 frequency component and the chromatic dispersion is suppressed to ±100 ps/nm, following which information of the f3 frequency component is used to carry out tracking or the like of minute changes in the residual chromatic dispersion whereby the chromatic dispersion can be compensated with high accuracy. By adopting this type of range switching, the optimum dynamic range for equalizing the chromatic dispersion can be selected. In addition, the residual chromatic dispersion in optical signal 615 can be equalized even when the chromatic dispersion changes over time in optical signal 633 received from the transmission path. The residual chromatic dispersion in optical signal 645 can also be equalized by implementing the same type of control.

In the third example, the transmission unit of transponder 600 is of the same configuration as polarization-division-multiplexing pseudo-RZ transmitter 300 shown in FIG. 4 and produces a polarization-division-multiplexed 112-Gb/s PRZ (4, 8)-QPSK signal. The CD monitor of transponder 600 is of the same configuration as CD monitor 400 shown in FIG. 5 and is set to f1=f/8 and f2=f/4. Transponder 630 may also be configured from similar transmitter and CD monitor.

In this case, variable chromatic dispersion equalizer 664 is controlled such that monitor signal 661 that indicates the chromatic dispersion is minimized. As shown in by graph 1350 of FIG. 14E, if the residual chromatic dispersion in optical signal 615 is within ±1000 ps/nm, the amount of CD can be accurately determined, the residual chromatic dispersion can be made zero, and the quality of data signal 617 can be optimized. In order to implement this type of control, information from the f1 frequency component is used to generate monitor signal 660 in the initial stage of control and the residual chromatic dispersion is first suppressed to within 400 ps/nm. Monitor signal 660 is then generated based on information from the f2 frequency component and finer control is implemented. The adoption of this type of range switching enables selection of the optimum dynamic range. The residual chromatic dispersion in optical signal 615 can be equalized even when chromatic dispersion changes over time in optical signal 633 received from the transmission path. The residual chromatic dispersion in optical signal 645 can also be equalized by implementing the same control over variable chromatic dispersion equalizer 664.

Figure 8:
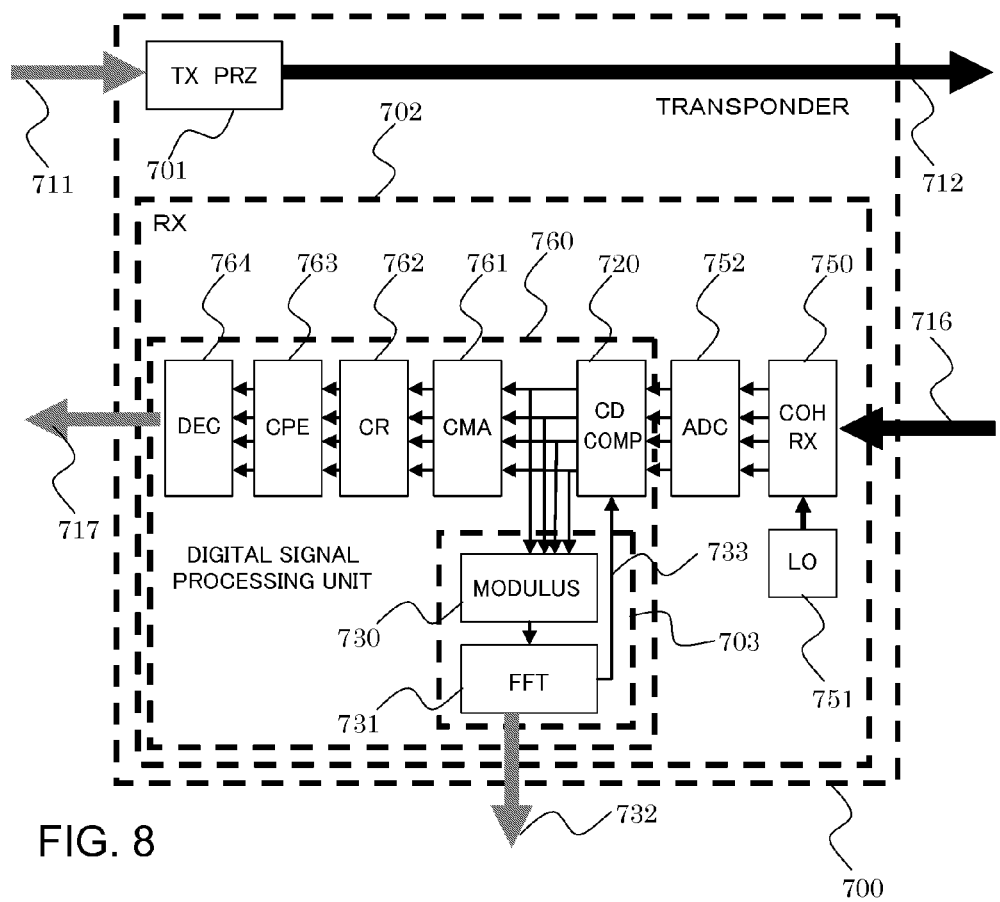
FIG. 8 is a block diagram showing an example of the configuration of a transponder with an automatic chromatic dispersion equalization function in the fifth exemplary embodiment of the present invention.

Next, as the fifth exemplary embodiment of the present invention, an example of the configuration of a transponder with an automatic chromatic dispersion equalizing function is next described. FIG. 8 shows an example of the configuration of the transponder in this exemplary embodiment.

In general terms, transponder 700 includes transmission unit (TX PRZ) 701 and reception unit 702. Transmission unit 701 modulates an optical carrier by data signal 711, which is an electric signal that indicates the data to be transmitted, and by using a pseudo-RZ modulation scheme on the modulated optical carrier, applies dips in the intensity of the optical carrier to generate optical signal 712 and then transmits optical signal 712. Reception unit 702 receives optical signal 716, carries out coherency detection, demodulation, and supplies electric signal 717 as received data as well as monitors the chromatic dispersion in optical signal 716 to equalize the chromatic dispersion based on results of the monitoring. This type of reception unit includes: coherency reception module (COH RX) 750; laser 751 provided as a local oscillator (LO); analog-to-digital converter (ADC) 752 that converts the analog electric signal supplied from coherency reception module 750 to a digital signal; and digital signal processing unit 752 that carries out signal processing of the received signal that has been digitized. As in the case of each of the above-described exemplary embodiments, the pseudo-RZ modulation method is used to apply a dip in intensity for every n symbols to optical signal 716 that is received by reception unit 702.

Coherency reception module 750 includes a 90-degree hybrid and four balanced photodiodes, and incident optical signal 716 is mixed with local oscillation light from laser 751 and subjected to coherency detection. Four output analog signals from coherency reception module 750, i.e., the received signals, are converted to a digital signal by analog-to-digital converter 752 and supplied to digital signal processing unit 760.

Digital signal processing unit 760 includes: CD compensation unit (CD COMP) 720 that compensates chromatic dispersion by FIR (Finite Impulse Response) filtering calculation; chromatic dispersion monitor unit 703 that detects chromatic dispersion based on the output from CD compensation unit 720; polarization separation calculation unit (CMA) 761 that carries out polarization-separation calculation for the output from CD compensation unit 720; clock extraction unit (CR) 762 that is connected to the output of polarization separation calculation unit 761 and that extracts clocks from the signal after the polarization-separation; frequency difference compensation unit (CPE) 763 that compensates the carrier frequency difference for the signal after the clock extraction; and demodulation unit (DEC) 764 that demodulates the signal for which compensation of carrier frequency difference has been carried out. The output of CD compensation unit 720 is split and conferred to chromatic dispersion monitor unit 703 and polarization separation calculation unit 761. Polarization separation calculation unit 761 carries out polarization separation calculation by means of a CMA (Constant Modulus Algorithm). Frequency difference compensation unit 763 implements compensation of the carrier frequency difference between local oscillation light 751 and received optical signal 716 by means of a CPE (Carrier Phase Estimation) algorithm. The output from demodulation unit 764 is data signal 717 that is an electric signal representing the received data.

Chromatic dispersion monitor unit 703 is next described in detail. Chromatic dispersion monitor unit 703 detects residual chromatic dispersion, generates monitor signal 733 that represents the residual CD value, and controls the chromatic dispersion compensation in CD compensation unit 720 by means of this monitor signal 733. The tap coefficients of the FIR filter in CD compensation unit 720 are set such that the residual CD value indicated by monitor signal 733 is minimized. In addition, a signal identical to monitor signal 733 is supplied to the outside of transponder 700 as monitor signal 732. Monitor signal 732 can, for example, be used for carrying out chromatic dispersion compensation outside transponder 700. Chromatic dispersion monitor unit 703 in this configuration includes: absolute value calculation unit (MODULUS) 730 that calculates the absolute value, and FFT analysis unit 731 that analyzes the output of absolute value calculation unit 730 by means of Fast Fourier Transform (FFT) and generates monitor signal 733. Absolute value calculation unit 730 first calculates the absolute value of the signal that is applied as input to chromatic dispersion monitor unit 703. This calculated value represents the amplitude of received optical signal 716. FFT analysis unit 731 then performs Fourier transform by means of a FFT algorithm upon the output of absolute value calculation unit 730 to calculate the intensity of a frequency component that is the same as the frequency of dips realized by pseudo-RZ modulation that have been applied to optical signal 716 or the intensity of the frequency component of its harmonic. FFT analysis unit 731 then calculates the value of the chromatic dispersion by the same method as in the above-described exemplary embodiments, and generates monitor signal 733. FFT analysis unit 731 may hold a look-up table that indicates the relations between the magnitude of chromatic dispersion and the intensity of the selected frequency component, and the value of residual chromatic dispersion may be found by retrieving this look-up table based on the intensity of the selected frequency component. The look-up table may be stored, for example, in a memory medium such as a memory device belonging to digital signal processing unit 760.

When the tap coefficients of the FIR filter in CD compensation unit 720 are set such that the value of monitor signal 732 supplied to CD compensation unit 720 from chromatic dispersion monitor unit 703 is a minimum, the influence of residual chromatic dispersion becomes zero in the signal that is the object of demodulation, whereby the quality of data signal 717 supplied from demodulation unit 764 is optimized.

This type of transponder 700 can be used as, for example, transponders 500 and 530 of the optical transmission and reception system shown in FIG. 6, or can be used as transponders 600 and 630 of the optical transmission and reception system shown in FIG. 7.

Transmitters, CD monitors, and transponders based on exemplary embodiments of the present invention have been described hereinabove. By arranging these transmitters or transponders on the transmitting side, arranging the CD monitors or transponders on the receiving side, and connecting the receiving side and transmitting side by a transmission path such as an optical fiber, an optical transmission and reception system can be configured that can detect on the receiving side chromatic dispersion that occurs on the transmission path.

Figure 9:
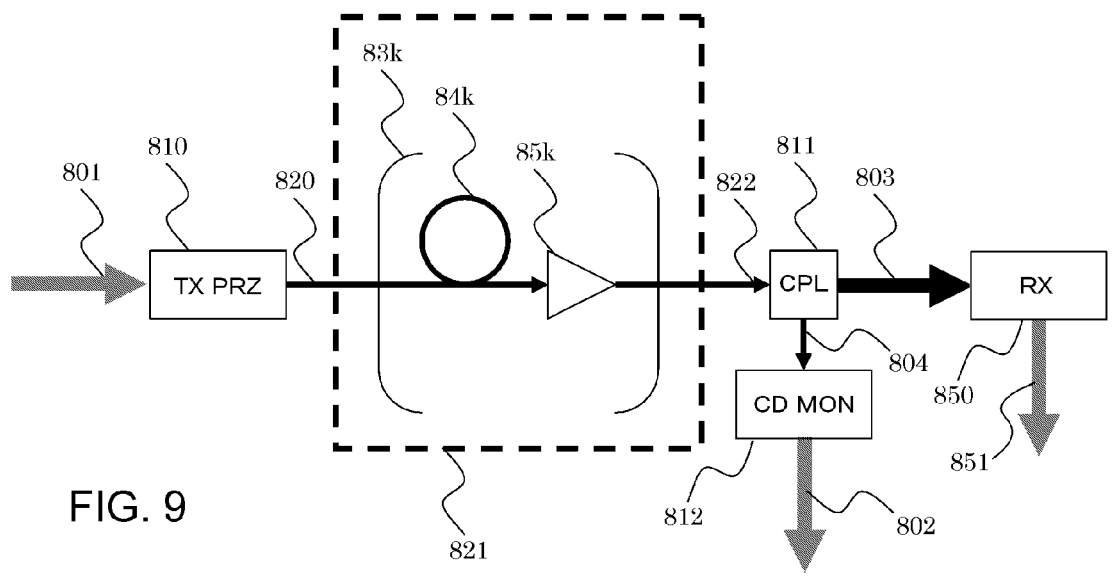
FIG. 9 is a block diagram showing an example of the configuration of an optical transmission system capable of detecting chromatic dispersion.

FIG. 9 shows an example of the configuration of the optical transmission system that can detect chromatic dispersion that can occur on the transmission path in this way.

Transmitter (TX PRZ) 810 is provided on the transmitting side. Transmitter 810 modulates the optical carrier by means of electric signal 801 that represents data to be transmitted, and further, applies a dip every n symbols by means of pseudo-RZ modulation identical to that described above to the optical carrier after the modulation. Optical signal 820 that has thus undergone modulation and the application of dips is transmitted to the receiving side by way of transmission path 821. Transmitter 810 is configured to enable changing the transmission wavelength in this output signal 820 that is transmitted, i.e., the wavelength of the optical carrier. Transmitter 100 shown in FIG. 2 or transmitter 300 shown in FIG. 4 can be used as this transmitter 810.

Transmission path 820 includes one or a plurality of spans that are connected in a series, reference number 83$k$ being used to represent these spans. Each span 83$k$ includes: optical fiber 84$k$; and optical amplifier 85$k$ that amplifies the optical signal transmitted in on optical fiber 84$k$ and transmits the optical signal to the receiving side.

On the receiving side, coupler (CPL) 811 that branches optical signal 822 that has been transmitted on transmission path 821 into two optical signals 803 and 804, CD monitor (CD MON) 812 that receives optical signal 804, detects the chromatic dispersion, and supplies monitor signal 802 according to the detected value are provided. Optical signal 803 is supplied to, for example, receiver (RX) 850 that receives and demodulates the optical signal and supplies data signal 851. Receiver 850 is typically used in an optical communication system or optical communication network and detailed explanation regarding its configuration is therefore here omitted. Alternatively, optical signal 803 may be transmitted by way of another transmission path. As CD monitor 812, CD monitor 200 shown in FIG. 3 or CD monitor 400 shown in FIG. 5 can be used.

An operator or system that monitors transmission path 821 can use monitor signal 802 for implementing operation, optimization, or monitoring of a transmission path. By using as transmitter 810 a device that can vary transmission wavelength, information relating to chromatic dispersion on each wavelength can be obtained.

Figure 10:
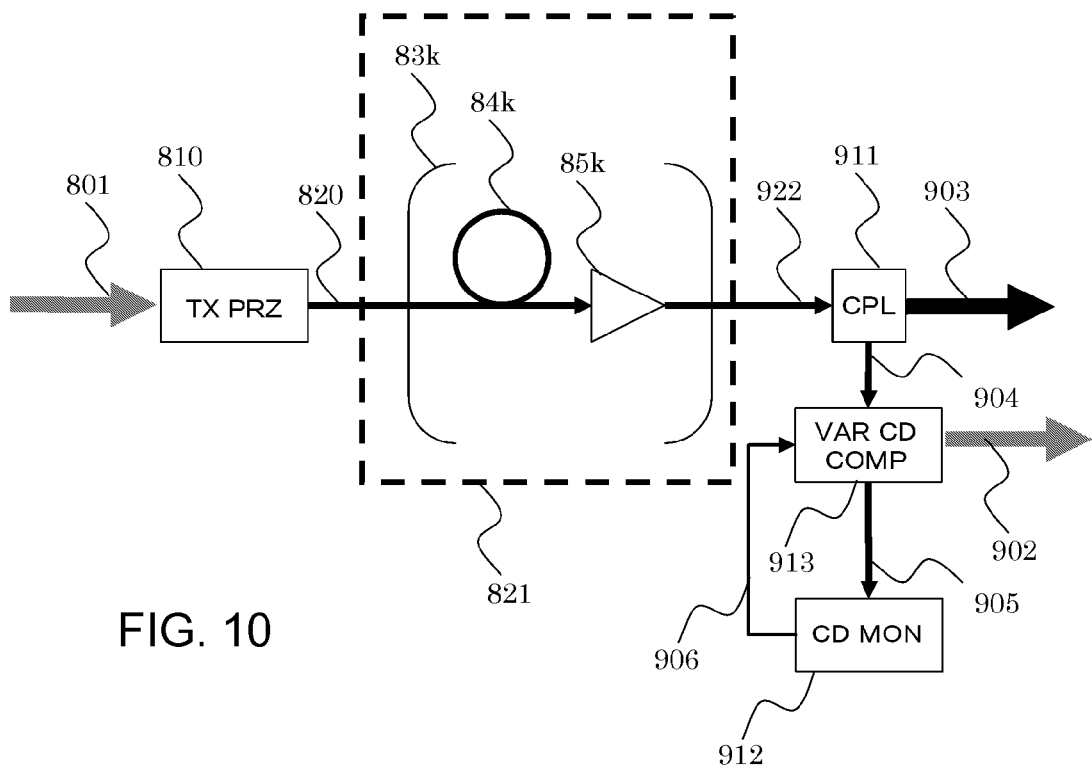
FIG. 10 is a block diagram showing another example of the configuration of an optical transmission system capable of detecting chromatic dispersion.

FIG. 10 shows another example of the configuration of an optical transmission system that can detect chromatic dispersion that can occur on a transmission path. The optical transmission system shown in FIG. 10 is a system in which only the configuration on the receiving side has been altered in the optical transmission system in FIG. 9, and the configuration on the transmitting side and transmission path 821 are identical to the system shown in FIG. 9.

The receiving side includes: coupler (CPL) 911 that branches optical signal 822 that has been transmitted on transmission path 821 into two optical signals 903 and 904; variable chromatic dispersion equalizer (VAR CD COMP) 913 that compensates the chromatic dispersion in optical signal 904; and CD monitor (CD MON) 912 that receives output optical signal 905 from variable chromatic dispersion equalizer 913, detects chromatic dispersion, and supplies monitor signal 906 that accords with the detected value. Similar to the case of FIG. 9, optical signal 903 may be supplied to the receiver, or may be transmitted to another transmission path. CD monitor 200 shown in FIG. 3 or CD monitor 400 shown in FIG. 5 can be used as CD monitor 912. CD monitor 912 controls variable chromatic dispersion equalizer 913 such that monitor signal 906 that indicates chromatic dispersion is minimized. The setting values in variable chromatic dispersion equalizer 913 are supplied to the outside as signal 902 that shows the chromatic dispersion value. The operator or system that monitors transmission path 821 can use signal 902 to implement operation, optimization, or monitoring of a transmission path.

Figure 11:
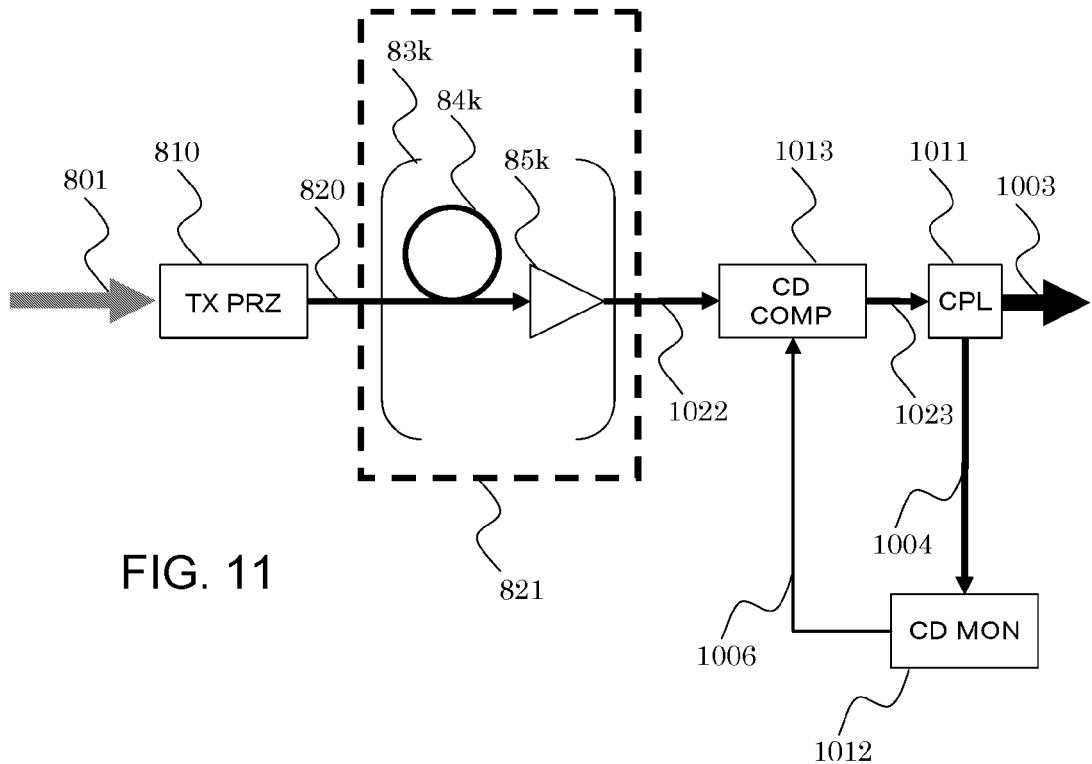
FIG. 11 is a block diagram showing an example of the configuration of an optical transmission system capable of detecting and equalizing chromatic dispersion.

FIG. 11 shows an example of the configuration of an optical transmission system that can detect chromatic dispersion that can occur in a transmission path and that can equalize this chromatic dispersion. The optical transmission system shown in FIG. 11 is a system in which only the configuration of the receiving side has been altered in the optical transmission system shown in FIG. 9, and the configuration of transmitting side and transmission path 821 are identical to the configuration shown in FIG. 9.

On the receiving side, optical signal 822 transmitted on transmission path 821 is first sent to chromatic dispersion equalizer (VAR CD COMP) 1013. The output optical signal 1023 from chromatic dispersion equalizer 1013 is next applied as input to coupler (CPL) 1011 and branched into optical signal 1003 and optical signal 1004. Optical signal 1003 may be supplied to the receiver as in the case shown in FIG. 9 or may be transmitted to another transmission path. On the other hand, optical signal 1004 is sent to CD monitor (CD MON) 1012 that receives optical signal 1004 to detect chromatic dispersion, and supplies monitor signal 1002 that accords with the detected value. CD monitor 200 shown in FIG. 3 or CD monitor 400 shown in FIG. 5 can be used as CD monitor 1012. CD monitor 1012 controls chromatic dispersion equalizer 1013 such that monitor signal 1006 that indicates the chromatic dispersion is minimized. As a result, the residual chromatic dispersion in the output of chromatic dispersion equalizer 1013 relating to optical signal 823 transmitted on transmission path 821 becomes zero. As a result, it can be guaranteed that the effect of relay chromatic dispersion relating to transmission path 821 in optical signal 1003 supplied from coupler 1011 will be zero.

The graphs shown in FIGS. 12A to 12D, FIGS. 13A to 13C, and FIGS. 14A to 14E that were used when explaining the above-described exemplary embodiments are next described in greater detail.

FIGS. 12A to 12C are for showing the waveform of a 55-Gb/s NRZ-QPSK signal and a 55-Gb/s pseudo-RZ-QPSK signal. Graph 1110 of FIG. 12A shows a 55-Gb/s NRZ-QPSK signal. Graph 1120 of FIG. 12B shows a 55-Gb/s pseudo-RZ (4)-QPSK signal in which dips 1121 in optical intensity have been applied by pseudo-RZ modulation every four symbols. Graph 1130 of FIG. 12C shows a 55-Gb/s pseudo-RZ(8)-QPSK signal in which dips 1131 have been applied by pseudo-RZ modulation every eight symbols. Graph 1140 of FIG. 12D shows the waveform of the signal obtained by applying polarization-division-multiplexing to the signal of the waveform shown in graph 1120 and the signal of the waveform shown in graph 1130. Accordingly, graph 1140 shows the waveform of a 110-Gb/s pseudo-RZ(4, 8)-QPSK signal. In graph 1140, deeper dip 1141 appears at the location at which dips resulting from the pseudo-RZ(4) format coincide with dips resulting from the pseudo-RZ(8) format. In contrast, relatively shallow dips 1142 are dips resulting from only the pseudo-RZ(4) format.

By means of pseudo-RZ modulation, dips of a narrow time width are applied to the optical intensity every n symbols in a signal. The application of these dips is not only realized by a format that differs from normal RZ driven by a clock of 1/n the symbol rate, but also adds to the optical signal a frequency component that is lower than the symbol rate. On the other hand, in contrast to a case in which the intensity modulation of an optical signal is carried out at low frequency, deterioration of signal quality does not occur in this type of application of dips.

FIGS. 13A to 13C each show graphs that show the simulation results of the intensity spectrums relating to an NRZ-QPSK signal, a PRZ-QPSK signal and an RZ-QPSK signal, all of these signals having a 56-Gb/s data rate. In each graph, the vertical axis represents the spectral power density (SPD). Graph 1201 of FIG. 13A shows the simulation results of an intensity spectrum of an electric signal obtained by directly receiving a 56-Gb/s pseudo-RZ(8)-QPSK signal. By carrying out pseudo-RZ(8) modulation, the frequency component of ⅛ the symbol rate becomes strong. This frequency is the dip production frequency realized by pseudo-RZ modulation. By using dips having a narrow time width, the harmonic components of the dip frequency also appear at high intensity.

As a comparison, graph 1202 of FIG. 13B shows the simulation result of the intensity spectrum for a 56-Gb/s NRZ-QPSK signal. The frequency component of the symbol rate appears strong, but there is no place where the spectrum is particularly strong on the lower-frequency side. Graph 1203 of FIG. 13C shows a similar simulation result for a 56-Gb/s RZ-QPSK signal. In this case as well, the frequency component of the symbol rate appears strong, but there is no place on the lower-frequency side in which the spectrum is particularly strong.

All of FIGS. 14A to 14E show graphs indicating the simulation results of how the intensity of the frequency component applied in the pseudo-RZ format changes according to chromatic dispersion. In these graphs, the vertical axes show the values of signals by the peak-to-peak voltage (Vpp) of the normalized clock.

Graph 1310 of FIG. 14A shows, in a case in which a 56-Gb/s pseudo-RZ (4)-QPSK signal is influenced by chromatic dispersion during transmission, the change of monitor signal 202 supplied from CD monitor 200 when this type of optical signal is received at CD monitor 200 shown in FIG. 3. In this case, monitor signal 202 is produced using the intensity of the frequency component of ¼ the symbol rate. When the chromatic dispersion is within ±400 ps/nm, the only minimum point in monitor signal 202 is at the time that chromatic dispersion is zero. Monitor signal 202 shows symmetrical change around the zero-dispersion point. Accordingly, regarding the signal that is represented in graph 1310, if control is implemented such that the signal becomes a minimum, chromatic dispersion control can be implemented such that the residual chromatic dispersion becomes zero. In addition, the absolute value of chromatic dispersion can be found from the value of the monitor signal. If the sign of chromatic dispersion is already known, the actual value of the chromatic dispersion value can be found from the value of the monitor signal.

Similar to the case of graph 1310, graph 1320 of FIG. 14B shows the change due to chromatic dispersion of monitor signal 202 supplied from CD monitor 200 relating to a 56-Gb/s pseudo-RZ(4)-QPSK signal, but the range of chromatic dispersion differs from that of graph 1310. In graph 1320, the change of the monitor signal is shown over a wider range for positive chromatic dispersion.

As can be seen from the results of graphs 1310 and 1320, using monitor signal 202 from CD monitor 200 enables control of the chromatic dispersion over the broad range of ±400 ps/nm.

Graph 1330 of FIG. 14C shows, in a case in which a 56-Gb/s pseudo-RZ (8)-QPSK signal is influenced by chromatic dispersion during transmission, the change of monitor signal 202 when this type of optical signal is received at CD monitor 200 shown in FIG. 3. The intensity of a frequency component that is ⅛ the symbol rate is used to produce monitor signal 202. The change in intensity of the monitor signal is similar to the change shown in graph 1320. In graph 1330, only the positive region of the chromatic dispersion is shown, but the change of the monitor signal with respect to chromatic dispersion was a symmetrical shape around the zero-dispersion point. As can be seen from graph 1330, in the case of a pseudo-RZ(8)-QPSK signal, use of monitor signal 202 enables control of chromatic dispersion over a still broader range of ±1000 ps/nm.

Graph 1340 of FIG. 14D shows, in a case in which a 56-Gb/s pseudo-RZ (16)-QPSK signal is influenced by chromatic dispersion during transmission, the change in monitor signal 202 when this type of optical signal is received at CD monitor 200 that is shown in FIG. 3. The intensity of the frequency component of 1/16 the symbol rate is used to produce monitor signal 202. The change in the intensity of the monitor signal is similar to the change shown in graph 1320. Graph 1330 shows only the positive region of chromatic dispersion, but the change of monitor signal with respect to chromatic dispersion was a symmetrical shape around the zero-dispersion point. As can be seen from graph 1340, in the case of a pseudo-RZ(16)-QPSK signal, the use of monitor signal 202 enables control of chromatic dispersion over a still broader range of ±2000 ps/nm.

When detection of chromatic dispersion over an even still broader range is desired, dips should be added to the optical signal every n symbols by pseudo-RZ modulation and the value of n should be made greater than 16. The production of the monitor signal should employ the intensity of the dip frequency component when this value of n is large.

Graph 1350 of FIG. 14E shows, in a case in which a 56-Gb/s pseudo-RZ(8)-QPSK signal is influenced by chromatic dispersion during transmission, the change in monitor signal 402 when this type of optical signal is received at CD monitor 400 shown in FIG. 5. The dip frequency in this case is ⅛ the symbol rate. It is assumed that, by enabling the generation of the monitor signal based on a plurality of frequency components in CD monitor 400, the three types: dip frequency component (i.e., ⅛ the symbol rate), and the secondary and quaternary harmonic components (a component of ¼ the symbol rate and a component of ½ the symbol rate) are used in the generation of monitor signal. Graph 1350 shows the change in intensity of the monitor signal for each of these frequency components. The signal realized by the frequency component of ⅛ the symbol rate is shown by curve 1351, the signal realized by the frequency component of ¼ the symbol rate is shown by curve 1352, and the signal realized by the frequency component of ½ the symbol rate is shown by curve 1353. The shape of change of all of the signals is the same as the shape in the above-described graph 1320, and the change is a symmetrical shape with respect to the zero-dispersion point.

As shown in graph 1350, if the monitor signal is generated using curve 1351, i.e., using the dip frequency component, the control range of chromatic dispersion can be set wide. However, because the rate of change of the monitor signal is small in the vicinity of the zero-dispersion, fine control is problematic in the vicinity of zero-dispersion. The case in which the rate of change is great in the vicinity of zero-dispersion is, as shown in waveform 1353, the monitor signal that is generated using the quaternary harmonic of the dip frequency. By selecting which frequency component to use when generating the monitor signal, an appropriate dynamic range can be set for each control range, and the control of chromatic dispersion can be carried out over a broad range and with high accuracy.

Exemplary embodiments have been described hereinabove. Exemplary technological features of the present invention are noted below.

(Supplementary Note 1) A method of monitoring chromatic dispersion when transmitting an optical signal, the method including:

applying, to an optical signal in which the symbol rate is f, a dip in the optical intensity for every n symbols by pseudo-RZ modulation where n is an integer equal to or greater than 2, and then transmitting the optical signal to which dips have been applied to a transmission path;

receiving the optical signal that has been transmitted on the transmission path and detecting the intensity of a frequency component of k*f/n from the received signal where k is an integer equal to or greater than 1; and based on the detected intensity, generating a monitor signal that represents the chromatic dispersion amount.

(Supplementary Note 2) The method as set forth in Supplementary Note 1, wherein a band-pass filter is used to detect the intensity of the frequency component of k*f/n.

(Supplementary Note 3) The method as set forth in Supplementary Note 1, wherein the received signal obtained by receiving the optical signal from the transmission path is converted to a digital signal, and the digital signal is subjected to a digital signal processing to detect the intensity of the frequency component of k*f/n.

(Supplementary Note 4) The method as set forth in any one of Supplementary Notes 1 to 3, wherein, when detecting the intensity of the frequency component of k*f/n, a plurality of different integers k are used to determine the intensity for each of a plurality of frequency components, and the monitor signal is generated for each of the plurality of frequency components.

(Supplementary Note 5) A method of equalizing chromatic dispersion when transmitting an optical signal, including:

applying, to an optical signal in which the symbol rate is f, a dip in optical intensity for every n symbols by means of pseudo-RZ modulation where n is an integer equal to or greater than 2, and transmitting the optical signal to which dips have been applied to a transmission path;

receiving the optical signal that has been transmitted on the transmission path and detecting the intensity of a frequency component of k*f/n from the received signal where k is an integer equal to or greater than 1;

based on the detected intensity, generating a monitor signal that represents the chromatic dispersion amount; and controlling an equalizer that equalizes the optical signal such that the value that is represented by the monitor signal is minimized.

(Supplementary Note 6) The method as set forth in Supplementary Note 5, wherein:

the dips are applied to each of a plurality of optical signals of different wavelengths;

the plurality of optical signals to which the dips are applied are subjected to wavelength-multiplexing and transmitted to the transmission path; and the received optical signal undergoes wavelength separation to generate the monitor signal for each wavelength and the optical signal is equalized for each wavelength.

(Supplementary Note 7) The method as set forth in Supplementary Note 5, wherein:

the dips are applied to each of a plurality of optical signals of different wavelengths;

the plurality of optical signal to which the dips have been applied are subjected to wavelength-multiplexing and transmitted to the transmission path;

the monitor signal is generated for each wavelength;

the optical signal before wavelength-separation which is received from the transmission path is equalized such that a value shown by the monitor signal for each wavelength which is obtained by carrying out the wavelength-separation of the optical signal is minimized.

(Supplementary Note 8) The method as set forth in Supplementary Note 5, wherein:

dips are applied at different repeating frequencies to each of a plurality of optical signals of different polarization states;

the plurality of optical signals to which the dips have been applied are polarization-division-multiplexed and transmitted to the transmission path;

the monitor signal is generated for each of the different repeating frequencies.

(Supplementary Note 9) The method as set forth in any one of Supplementary Notes 5 to 8, wherein a band-pass filter is used to detect the intensity of the frequency component of $k*f/n$.

(Supplementary Note 10) The method as set forth in any one of Supplementary Notes 5 to 8, wherein the received signal obtained by receiving the optical signal from the transmission path is converted to a digital signal, and the digital signal is subjected to a digital processing to detect the intensity of the frequency component of $k*f/n$.

(Supplementary Note 11) The method as set forth in any one of Supplementary Notes 5 to 10, wherein, when detecting the intensity of the frequency component of $k*f/n$, a plurality of differing integers k are used to detect the intensity for each of a plurality of frequency components; and the monitor signal is generated for each of the plurality of frequency components.

(Supplementary Note 12) The method as set forth in Supplementary Note 11, wherein any one monitor signal among the monitor signals for each of the plurality of frequency components is used to control the equalizer.

(Supplementary Note 13) The method as set forth in Supplementary Note 11, wherein the monitor signals for each of the plurality of frequency components are switched according to the chromatic dispersion amount to control the equalizer.

(Supplementary Note 14) The method as set forth in any one of Supplementary Notes 1 to 13, wherein a look-up table that shows the relation between chromatic dispersion amounts and the intensities of the frequency components of $k*f/n$ is prepared in advance and the monitor signal is generated by retrieving the look-up table based on the detected intensity.

(Supplementary Note 15) A device that monitors chromatic dispersion when transmitting an optical signal, the device including:

a transmitter that applies, to an optical signal in which the symbol rate is f, a dip in the intensity for every n symbols by means of pseudo-RZ modulation, where n is an integer equal to or greater than 2, and that transmits the optical signal to which dips have been applied to a transmission path; and a chromatic dispersion monitor that receives the optical signal that is transmitted on the transmission path, that detects the intensity of a frequency component of $k*f/n$ from the received signal where k is an integer equal to or greater than 1, and that, based on the detected intensity, generates a monitor signal that indicates the chromatic dispersion amount.

(Supplementary Note 16) The device as set forth in Supplementary Note 15, wherein the transmitter includes: a modulator that modulates an optical carrier by a signal that indicates data to be transmitted; and a pseudo-RZ carver that applies the dips to the optical signal after modulation.

(Supplementary Note 17) The device as set forth in Supplementary Note 15 or 16, wherein the chromatic dispersion monitor includes: a light-receiving element that receives the optical signal from the transmission path; a band-pass filter that detects the intensity of the frequency component of $k*f/n$; and a monitor circuit that, based on the detected intensity, generates a monitor signal that represents the chromatic dispersion amount.

(Supplementary Note 18) The device as set forth in Supplementary Note 15 or 16, wherein the chromatic dispersion monitor includes a digital signal processing unit that converts a received signal obtained by receiving the optical signal from the transmission path to a digital signal, that subjects the digital signal to a digital signal processing to detect the intensity of the frequency component of $k*f/n$, and that generates the monitor signal.

(Supplementary Note 19) A device that equalizes chromatic dispersion when transmitting an optical signal, the device including:

a transmitter that applies, to an optical signal in which the symbol rate is f, a dip in optical intensity for every n symbols by means of pseudo-RZ modulation where n is an integer equal or greater than 2 and that transmits the optical signal to which dips have been applied to a transmission path;

a chromatic dispersion monitor that receives the optical signal that is transmitted on the transmission path, that detects the intensity of a frequency component of $k*f/n$ from the received signal where k is an integer equal to or greater than 1, and that, based on the detected intensity, generates a monitor signal that represents the chromatic dispersion amount; and a chromatic dispersion equalizer that equalizes the optical signal that is received from the transmission path such that the value represented by the monitor signal is minimized.

(Supplementary Note 20) The device as set forth in Supplementary Note 19, wherein the transmitter includes: a modulator that modulates an optical carrier by a signal that indicates the data to be transmitted; and a pseudo-RZ carver that applies the dips to the optical signal after modulation.

(Supplementary Note 21) The device as set forth in Supplementary Note 19 or 20, wherein the chromatic dispersion monitor includes: a light-receiving element that receives the optical signal from the transmission path; a band-pass filter that detects the intensity of the frequency component of $k*f/n$; and a monitor circuit that, based on the detected intensity, generates a monitor signal that indicates the chromatic dispersion amount.

(Supplementary Note 22) The device as set forth in Supplementary Note 19 or 20, wherein the chromatic dispersion monitor includes: an analog/digital converter that converts a received signal obtained by receiving the optical signal from the transmission path to a digital signal; and a digital signal processing unit that subjects the digital signal to a digital signal processing to detect the intensity of the frequency component of k*f/n and that generates the monitor signal.

(Supplementary Note 23) The as set forth in any one of Supplementary Notes 19 to 22, wherein the chromatic dispersion monitor includes a look-up table that shows the relation between the chromatic dispersion amounts and the intensities of the frequency components of k*f/n, and that retrieves the look-up table based on the detected intensity to generate the monitor signal.

(Supplementary Note 24) A transmitter that transmits an optical signal to a transmission path, the transmitter including:
a modulator that modulates an optical carrier by means of a signal that indicates data that to be transmitted; and
a pseudo-RZ carver that applies, to the optical signal after the modulation, a dip in the optical intensity for every n symbols by means of pseudo-RZ modulation where n is an integer equal to or greater than 2.

(Supplementary Note 25) A chromatic dispersion monitor that monitors chromatic dispersion in an optical signal that is transmitted on a transmission path, in which dips in optical intensity have been applied to the optical signal by pseudo-RZ modulation for every n symbols, the chromatic dispersion monitor including:
a light-receiving element that receives the optical signal and converts to a received signal;
a band-pass filter that detects the intensity of a frequency component of k*f/n from the received signal where k is an integer equal to or greater than 1; and
a monitor circuit that, based on the detected intensity, generates a monitor signal that shows the chromatic dispersion amount.

(Supplementary Note 26) A chromatic dispersion monitor that monitors chromatic dispersion in an optical signal in which dips in optical intensity have been applied in the optical signal by pseudo-RZ modulation for every n symbols and that is transmitted on a transmission path, the chromatic dispersion monitor including:
a light-receiving element that receives the optical signal and converts to a received signal;
an analog/digital converter that converts the received signal to a digital signal;
a digital signal processing unit that subjects the digital signal to a digital signal processing to detect the intensity of a frequency component of k*f/n and that, based on the detected intensity, generates a monitor signal that shows the chromatic dispersion amount.

Although the present invention has been described with reference to exemplary embodiments, the present invention is not limited to the above-described exemplary embodiments. The configuration and details of the present invention are open to various modifications within the scope of the present invention that will be clear to one of ordinary skill in the art.

This application is based upon and claims the benefits of priority from Japanese Patent Application No. 2010-000497, filed on Jan. 5, 2010, the disclosure of which is incorporated herein in its entirety by reference.

CITATION LIST

Patent Literatures

[PL1] JP-A-2000-346748
[PL2] JP-A-2003-134047
[PL3] WO2007/004338
[PL4] JP-A-2006-345541

Non-Patent Literatures

[NPL1] Kuwahara Shoichiro, et al., "Adaptive dispersion equalization with the detection of dispersion fluctuation using the PM-AM conversion," Abstract for the Annual Meeting 1998 of Communications Society: Institute of Electronics, Information and Communication Engineers (IEICE), pp. 417 (1998)
[NPL2] E. Le Taillandier de Gabory, et al., "Pseudo-Return-to-Zero Modulation Scheme: Application to Compensation of Intra-Polarization Skew for PolMux Signals," ECOC 2009, paper 3.4.4 (2009)
[NPL3] S. Sohma, et al., "40λ WDM Channel-by-Channel and Flexible Dispersion Compensation at 40 Gb/s Using Multi-channel and Flexible Dispersion Compensator," ECOC 2009, paper 3.3.1 (2009)

The invention claimed is:

1. A method of monitoring chromatic dispersion when transmitting an optical signal, the method comprising:
applying, to an optical signal in which a symbol rate is f, a dip in optical intensity for every n symbols where n is an integer equal to or greater than 2;
transmitting the optical signal to which dips have been applied to a transmission path;
receiving said optical signal that is transmitted on said transmission path and detecting intensity of a frequency component of k*f/n from the received signal where k is an integer equal to or greater than 1; and
based on said detected intensity, generating a monitor signal that represents a chromatic dispersion amount,
wherein an optical intensity at the applied dips is lower than an optical intensity of any of the symbols of said optical signal, and
wherein a time width of each of the applied dips is sufficiently short, such that optical amplitudes of central parts of said symbols of said optical signal are not modified.

2. The method as set forth in claim 1, further comprising:
when detecting the intensity of said frequency component of k*f/n, using a plurality of different integers k to detect intensity for each of a plurality of frequency components; and
generating said monitor signal for each of said plurality of frequency components.

3. The method as set forth in claim 1, further comprising:
preparing in advance a look-up table that shows relation between chromatic dispersion amounts and the intensities of frequency components of k*f/n, and retrieving said look-up table based on a detected intensity to generate said monitor signal.

4. A method of equalizing chromatic dispersion when transmitting an optical signal, the method comprising:
applying, to an optical signal in which a symbol rate is f, a dip in optical intensity for every n symbols where n is an integer equal to or greater than 2;
transmitting the optical signal to which dips have been applied to a transmission path;
receiving said optical signal that is transmitted on said transmission path and detecting intensity of a frequency component of k*f/n from the received signal where k is an integer equal to or greater than 1;
based on said detected intensity, generating a monitor signal that represents a chromatic dispersion amount; and controlling an equalizer that equalizes said optical signal such that a value represented by said monitor signal is minimized,
wherein an optical intensity at the applied dips is lower than an optical intensity of any of the symbols of said optical signal, and
wherein a time width of each of the applied dips is sufficiently short, such that optical amplitudes of central parts of said symbols of said optical signal are not modified.

5. The method as set forth in claim 4, further comprising:
applying said dips to each of a plurality of optical signals of different wavelengths;
wavelength-multiplexing said plurality of optical signals to which said dips have been applied and transmitting to said transmission path; and
separating wavelengths of a received optical signal to generate said monitor signal for each wavelength and equalizing said optical signals for each wavelength.

6. The method as set forth in claim 4, further comprising:
applying said dips to each of a plurality of optical signals of different wavelengths;
wavelength-multiplexing said plurality of optical signals to which said dips have been applied and transmitting to said transmission path;
generating said monitor signal for each wavelength; and
equalizing the optical signals before wavelength-separation that are received from said transmission path such that a value shown by said monitor signal for each wavelength which is obtained by carrying out the wavelength-separation of said optical signals is minimized.

7. The method as set forth in claim 4, further comprising:
applying dips at different repeating frequencies to each of a plurality of optical signals of different polarization states;
polarization-division-multiplexing said plurality of optical signals to which said dips are applied and transmitting to said transmission path; and
generating said monitor signal for each of said different repeating frequencies.

8. The method as set forth in claim 4, further comprising:
when detecting the intensity of said frequency component of k*f/n, using a plurality of different integers k to detect intensity for each of a plurality of frequency components; and
generating said monitor signal for each of said plurality of frequency components.

9. The method as set forth in claim 5, further comprising:
when detecting the intensity of frequency components of k*f/n, using a plurality of different integers k to detect intensity for each of a plurality of frequency components; and
generating said monitor signal for each of said plurality of frequency components.

10. The method as set forth in claim 6, further comprising:
when detecting the intensity of frequency components of k*f/n, using a plurality of different integers k to detect intensity for each of a plurality of frequency components; and
generating said monitor signal for each of said plurality of frequency components.

11. The method as set forth in claim 7, further comprising:
when detecting the intensity of frequency components of k*f/n, using a plurality of different integers k to detect intensity for each of a plurality of frequency components; and
generating said monitor signal for each of said plurality of frequency components.

12. The method as set forth in claim 4, further comprising:
preparing in advance a look-up table that shows relation between chromatic dispersion amounts and the intensities of frequency components of k*f/n, and retrieving said look-up table based on a detected intensity to generate said monitor signal.

13. A device that monitors chromatic dispersion when transmitting an optical signal, comprising:
a transmitter that applies, to an optical signal in which a symbol rate is f, a dip in optical intensity for every n symbols where n is an integer equal to or greater than 2 and that transmits the optical signal to which dips have been applied to a transmission path; and
a chromatic dispersion monitor that receives said optical signal that is transmitted on said transmission path, that detects intensity of a frequency component of k*f/n from the received signal where k is an integer equal to or greater than 1, and that, based on the detected intensity, generates a monitor signal that represents a chromatic dispersion amount,
wherein an optical intensity at the applied dips is lower than an optical intensity of any of the symbols of said optical signal, and
wherein a time width of each of the applied dips is sufficiently short, such that optical amplitudes of central parts of said symbols of said optical signal are not modified.

14. The device as set forth in claim 13, further comprising:
a chromatic dispersion equalizer that equalizes the optical signal that is received from said transmission path such that a value represented by said monitor signal is minimized.

15. The device as set forth in claim 14, wherein said chromatic dispersion monitor is provided with a look-up table that shows relation between chromatic dispersion amounts and intensities of frequency components of k*f/n and, retrieves said look-up table based on a detected intensity to generate said monitor signal.

16. The device as set forth in claim 13, wherein said chromatic dispersion monitor is provided with a look-up table that shows relation between chromatic dispersion amounts and intensities of said frequency components of k*f/n and, retrieves said look-up table based on a detected intensity to generate said monitor signal.

* * * * *